(12) United States Patent
Liao et al.

(10) Patent No.: US 9,857,563 B2
(45) Date of Patent: Jan. 2, 2018

(54) OPTICAL IMAGE SYSTEM, IMAGE CAPTURING DEVICE AND ELECTRONIC DEVICE

(71) Applicant: LARGAN PRECISION CO., LTD., Taichung (TW)

(72) Inventors: Lin-Yao Liao, Taichung (TW); Chun-Che Hsueh, Taichung (TW); Chien-Shun Wu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/226,057

(22) Filed: Aug. 2, 2016

(65) Prior Publication Data

US 2017/0315334 A1   Nov. 2, 2017

(30) Foreign Application Priority Data

Apr. 29, 2016 (TW) .............................. 105113495 A

(51) Int. Cl.
  *G02B 3/02* (2006.01)
  *G02B 13/00* (2006.01)
  *G02B 9/62* (2006.01)
  *G02B 27/00* (2006.01)

(52) U.S. Cl.
  CPC ........... *G02B 13/0045* (2013.01); *G02B 9/62* (2013.01); *G02B 27/0025* (2013.01)

(58) Field of Classification Search
  CPC .................................................. G02B 13/0045
  USPC ........................................................ 359/713
  See application file for complete search history.

(56) References Cited

U.S. PATENT DOCUMENTS

| | | |
|---|---|---|
| 8,335,043 B2 | 12/2012 | Huang |
| 8,379,323 B2 | 2/2013 | Huang et al. |
| 8,743,482 B1 | 6/2014 | Tsai et al. |
| 2013/0010181 A1 | 1/2013 | Baba |
| 2014/0043662 A1 | 2/2014 | Nakayama et al. |
| 2015/0160435 A1 | 6/2015 | Chen et al. |
| 2015/0241665 A1 | 8/2015 | Hashimoto |
| 2015/0301311 A1 | 10/2015 | Chen et al. |
| 2015/0301312 A1 | 10/2015 | Chen et al. |
| 2015/0301315 A1 | 10/2015 | Chen et al. |
| 2015/0323765 A1 | 11/2015 | Hashimoto |

(Continued)

FOREIGN PATENT DOCUMENTS

| | | |
|---|---|---|
| CN | 105572848 A | 5/2016 |
| CN | 106154495 A | 11/2016 |
| TW | I519809 B | 2/2016 |

*Primary Examiner* — James Jones
(74) *Attorney, Agent, or Firm* — McClure, Qualey & Rodack, LLP

(57) ABSTRACT

An optical image system includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has an image-side surface being concave in a paraxial region thereof. The third lens element has negative refractive power. The fifth lens element with negative refractive power has an object-side surface and an image-side surface being both aspheric. The sixth lens element has an object-side surface and an image-side surface being both aspheric.

32 Claims, 22 Drawing Sheets

(56) References Cited

U.S. PATENT DOCUMENTS

| | | |
|---|---|---|
| 2016/0004044 A1 | 1/2016 | Kubota et al. |
| 2016/0085052 A1 | 3/2016 | Park |
| 2016/0161713 A1* | 6/2016 | Huang .................. G02B 13/18 348/373 |
| 2016/0341934 A1* | 11/2016 | Mercado .................. G02B 9/62 |

* cited by examiner

OPTICAL IMAGE SYSTEM, IMAGE CAPTURING DEVICE AND ELECTRONIC DEVICE

RELATED APPLICATIONS

This application claims priority to Taiwan Application Serial Number 105113495, filed Apr. 29, 2016, which is herein incorporated by reference.

BACKGROUND

Technical Field

The present disclosure relates to an optical image system and an image capturing device. More particularly, the present disclosure relates to an optical image system and an image capturing device with a compact size applicable to electronic devices.

Description of Related Art

With the popularity of photographing module applications, utilizing photographing modules in various intelligent electronic devices, automobile devices, recognition devices, entertainment devices, sport devices and household intelligent assistance systems is becoming a major trend in developments of future technologies. For obtaining extensive experiences in utilizations of the photographing modules, intelligent devices with one, two or more than three lens assemblies are the market mainstream, and various lens systems with different features are developed in response to different demands.

Moreover, with the compact size requirement of electronic devices in recent years, the conventional photographing assemblies, especially the compact lens assemblies with large aperture or telephoto characteristic, have problem of excessive total track length, insufficient aperture, unfavorable image quality or insufficient compact size, so that both demands of high quality and compact size cannot be satisfied at the same time.

SUMMARY

According to one aspect of the present disclosure, an optical image system includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has an image-side surface being concave in a paraxial region thereof. The third lens element has negative refractive power. The fifth lens element with negative refractive power has an object-side surface and an image-side surface being both aspheric. The sixth lens element has an object-side surface and an image-side surface being both aspheric. The optical image system has a total of six lens elements, there is an air space between every two lens elements of the first lens element, the second lens element, the third lens element, the fourth lens element, the fifth lens element and the sixth lens element that are adjacent to each other. At least one surface of at least one of the fifth lens element and the sixth lens element includes at least one inflection point. When a focal length of the first lens element is f1, a focal length of the second lens element is f2, a focal length of the third lens element is f3, a focal length of the fifth lens element is f5, and a focal length of the sixth lens element is f6, the following conditions are satisfied:

$-0.60 < f3/f2 < 1.10;$ $-1.15 < f1/f3 < 0;$ and $-2.0 < f5/f6 < 1.5.$

According to another aspect of the present disclosure, an image capturing device includes the optical image system of the aforementioned aspect and an image sensor, wherein the image sensor is disposed on an image surface of the optical image system.

According to yet another aspect of the present disclosure, an electronic device includes the image capturing device of the aforementioned aspect.

According to further another aspect of the present disclosure, an optical image system includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has negative refractive power. The third lens element has negative refractive power. The fifth lens element with negative refractive power has an object-side surface and an image-side surface being both aspheric. The sixth lens element has an object-side surface being concave in a paraxial region thereof, and the object-side surface and an image-side surface of the sixth lens element are both aspheric. The optical image system has a total of six lens elements, there is an air space between every two lens elements of the first lens element, the second lens element, the third lens element, the fourth lens element, the fifth lens element and the sixth lens element that are adjacent to each other. At least one surface of at least one of the fifth lens element and the sixth lens element includes at least one inflection point. When a focal length of the first lens element is f1, a focal length of the second lens element is f2, a focal length of the third lens element is f3, a focal length of the fifth lens element is f5, and a focal length of the sixth lens element is f6, the following conditions are satisfied:

$0 < f3/f2 < 1.30;$ $-2.50 < f1/f3 < 0;$ and $-2.0 < f5/f6 < 1.0.$

According to still another aspect of the present disclosure, an optical image system includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The third lens element has negative refractive power. The fifth lens element with negative refractive power has an object-side surface and an image-side surface being both aspheric. The sixth lens element has an image-side surface being convex in a paraxial region thereof, and an object-side surface and the image-side surface of the sixth lens element are both aspheric. The optical image system has a total of six lens elements, there is an air space between every two lens elements of the first lens element, the second lens element, the third lens element, the fourth lens element, the fifth lens element and the sixth lens element that are adjacent to each other. At least one surface of at least one of the fifth lens element and the sixth lens element includes at least one inflection point. When a focal length of the first lens element is f1, a focal length of the second lens element is f2, a focal length of the third lens element is f3, a focal length of the fifth lens element is f5, and a focal length of the sixth lens element is f6, the following conditions are satisfied:

$-1.50 < f3/f2 < 1.50;$ $-2.75 < f1/f3 < 0;$ and $-2.4 < f5/f6 < 1.75.$

DETAILED DESCRIPTION

Figure 1:
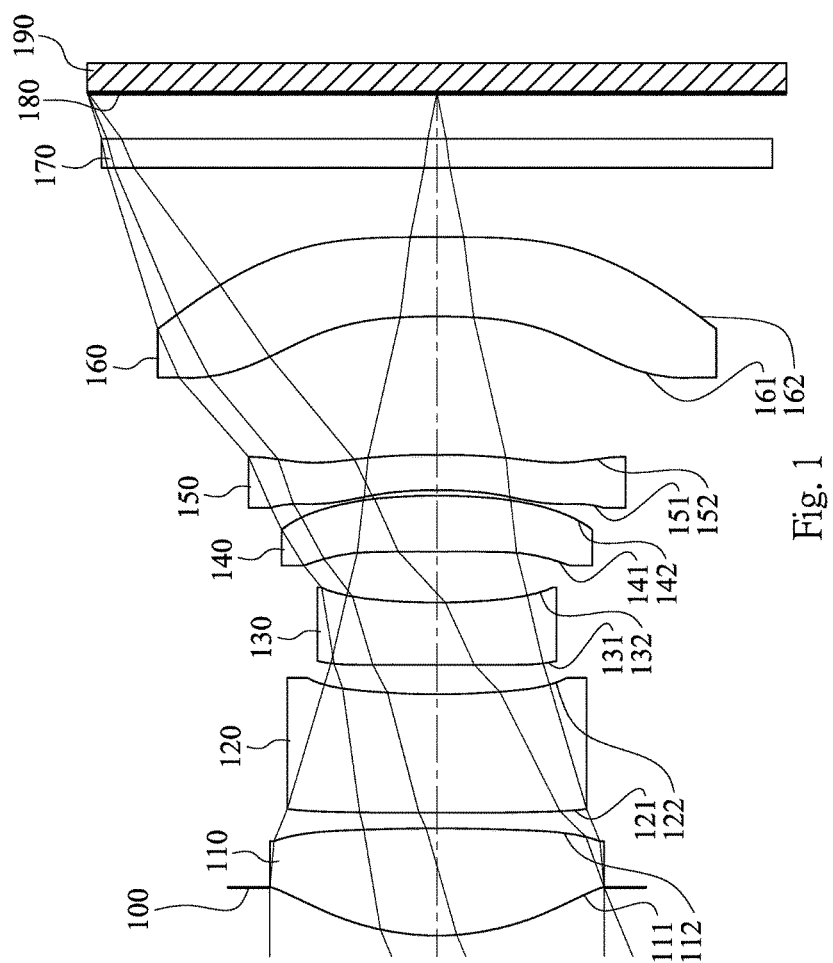
FIG. 1 is a schematic view of an image capturing device according to the 1st embodiment of the present disclosure.

An optical image system includes, in order from an object side to an image side, a first lens element, a second lens element, a third lens element, a fourth lens element, a fifth lens element and a sixth lens element, wherein the optical image system has a total of six lens elements.

According to the optical image system of the present disclosure, there is an air space between every two lens elements of the first lens element, the second lens element, the third lens element, the fourth lens element, the fifth lens element and the sixth lens element that are adjacent to each other. That is, each of the first through sixth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element, the fifth lens element and the sixth lens element of the optical image system, there is a space in a paraxial region between every pair of lens elements that are adjacent to each other. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the optical image system. Therefore, according to the optical image system of the present disclosure, having an air space in a paraxial region between every two of the first lens element, the second lens element, the third lens element, the fourth lens element, the fifth lens element and the sixth lens element that are adjacent to each other of the present disclosure avoids the problem generated by the cemented lens elements.

The first lens element with positive refractive power has an object-side surface being convex in a paraxial region thereof. Therefore, the main converging ability of the incident light can be provided so as to reduce the volume of the optical image system and obtain an optimal compact size.

The second lens element can have negative refractive power and an image-side surface being concave in a paraxial region thereof. Therefore, aberrations of the optical image system can be corrected.

The third lens element with negative refractive power can have an image-side surface being concave in a paraxial region thereof. Therefore, the ability for correcting aberrations of the optical image system can be strengthened.

The fifth lens element with negative refractive power has an object-side surface being concave in a paraxial region thereof and an image-side surface being concave in a paraxial region thereof. Therefore, it is favorable for enhancing the negative refractive power by the surface shape of the fifth lens element, and also favorable for reducing the manufacturing difficulty of the lens element by the proper surface curvature of the lens element.

The sixth lens element can have an object-side surface being concave in a paraxial region thereof and an image-side surface being convex in a paraxial region thereof. Therefore, it is favorable for balancing characteristics between telephoto and compactness.

Furthermore, at least one surface of at least one of the fifth lens element and the sixth lens element includes at least one inflection point. Therefore, it is favorable for effectively reducing the incident angle of the off-axial field of view so as to increase the responding efficiency of an image sensor.

When a focal length of the second lens element is f2, and a focal length of the third lens element is f3, the following condition is satisfied: $-1.50 < f3/f2 < 1.50$. Therefore, the refractive power arrangement of the second lens element and the third lens element can be balanced so as to eliminate aberrations of the first lens element, and the aberration overcorrection by excessive refractive power of the second lens element or the third lens element or the insufficient aberration correction from lacking refractive power thereof can be avoided. Preferably, the following condition can be satisfied: $-0.60 < f3/f2 < 1.10$. More preferably, the following condition can be satisfied: $0 < f3/f2 < 1.30$. Furthermore preferably, the following condition can be satisfied: $0 < f3/f2 < 1.0$.

When a focal length of the first lens element is f1, and the focal length of the third lens element is f3, the following condition is satisfied: $-2.75 < f1/f3 < 0$. Therefore, it is favorable for ensuring the first lens element with enough refractive power so as to allow sufficient light entry into the optical image system with the larger aperture configuration, and it is also favorable for adjusting the optical image system and correcting the light path with the large aperture configuration by the arrangement of the third lens element. Preferably, the following condition can be satisfied: $-2.50 < f1/f3 < 0$. More preferably, the following condition can be satisfied: $-1.15 < f1/f3 < 0$.

When a focal length of the fifth lens element is f5, and a focal length of the sixth lens element is f6, the following condition is satisfied: $-2.4 < f5/f6 < 1.75$. Therefore, the fifth lens element which is located on the image side of the optical image system can have sufficient negative refractive power so as to correct curved images and reduce the back focal length, so that it is favorable for a compact size and better image quality of the optical image system. Furthermore, the arrangement can further avoid overly curved surfaces (in a crescent shape) with weaker negative refractive power of the fifth lens element which would result in manufacturing difficulties, or can avoid the relatively flat surfaces (in double concave shapes) which would lose the characteristic of aspheric surfaces. Preferably, the following condition can be satisfied: $-2.0 < f5/f6 < 1.5$. More preferably, the following condition can be satisfied: $-2.0 < f5/f6 < 1.0$. Furthermore preferably, the following condition can be satisfied: $0 < f5/f6 < 1.5$.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following condition is satisfied: $1.50 < (T45+T56)/(T12+T23+T34) < 5.0$. Therefore, it is favorable for properly arranging thinner lens elements such as the second lens element, the third lens element and the fourth lens element, so that the lens manufacturing difficulty from too small or too large distances between the lens elements can be avoided, and it is also favorable for utilizing the limited space among the fourth lens element, the fifth lens element and the sixth lens element by avoiding excessive spacing between each lens element.

When a central thickness of the first lens element is CT1, a central thickness of the second lens element is CT2, a central thickness of the third lens element is CT3, a central thickness of the fourth lens element is CT4, and a central thickness of the fifth lens element is CT5, the following condition is satisfied: $0.40 < (CT2+CT3+CT4+CT5)/CT1 < 1.65$. Therefore, it is favorable for obtaining the sufficient structure strength of the first lens element so as to provide the proper manufacturability with the central region and the off-axial region having a larger disparity in lens thicknesses.

When an Abbe number of the second lens element is V2, an Abbe number of the third lens element is V3, and an Abbe number of the fourth lens element is V4, the following condition is satisfied: $30 < V2+V3+V4 < 90$. Therefore, it is favorable for balancing the astigmatism and the chromatic aberration.

When a maximum optical effective radius of the object-side surface of the first lens element is Y11, and a maximum optical effective radius of an image-side surface of the third lens element is Y32, the following condition is satisfied: $1.05 < Y11/Y32 < 2.0$. Therefore, it is favorable for the more evenly distribution of the effective radii of the lens elements so as to satisfy the demand of compact size.

When a focal length of the optical image system is f, the focal length of the first lens element is f1, the focal length of the second lens element is f2, the focal length of the third lens element is f3, a focal length of the fourth lens element is f4, the focal length of the fifth lens element is f5, and the focal length of the sixth lens element is f6, the following condition is satisfied: $4.5 < \Sigma|f/fx| < 9.0$, wherein x=1, 2, 3, 4, 5, 6. Therefore, it is favorable for the balanced distribution of the refractive power of each lens element so as to avoid aberrations generated from the improper refractive power.

When the focal length of the optical image system is f, and a maximum image height of the optical image system is ImgH, the following condition is satisfied: $2.0 < f/ImgH < 7.5$. Therefore, the optical image system with telephoto characteristic can provide various photographing modes.

When a central thickness of the first lens element is CT1, and an axial distance between the image-side surface of the sixth lens element and an image surface is BL, the following condition is satisfied: $0.90 < CT1/BL < 2.5$. Therefore, it is favorable for providing compact size by enhancing the focusing ability on the object side of the optical image system and reducing the back focal length.

When the focal length of the first lens element is f1, and the focal length of the fourth lens element is f4, the following condition is satisfied: $0.10 < f1/f4 < 1.0$. Therefore, the sensitivity of the optical image system can be reduced effectively so as to enhancing the manufacturability of the lens elements.

When the central thickness of the first lens element is CT1, and a distance in parallel with an optical axis from an axial vertex on the object-side surface of the first lens element to a maximum effective radius position on the object-side surface of the first lens element is Sag11, the following condition is satisfied: $1.2 < CT1/Sag11 < 2.0$. Therefore, the refractive power of the object-side surface is enough to reduce the total track length of the optical image system so as to satisfy the demand of compact size.

When the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the axial distance between the fifth lens element and the sixth lens element is T56, the following condition is satisfied: $1.0 < T56/(T12+T23+T34+T45) < 5.0$. Therefore, it is favorable for arranging the second lens element, the third lens element, the fourth lens element and the fifth lens element which are thinner lens elements, so that the manufacturing difficulty from overly small distances between the lens elements can be avoided, and it is also favorable for balancing the distance between the fifth lens element and the sixth lens element, so that the compact size can be maintained and the interference between the lens elements can be avoided.

When the focal length of the optical image system is f, and an entrance pupil diameter of the optical image system is EPD, the following condition is satisfied: $1.80 < f/EPD < 3.0$. Therefore, it is favorable for providing sufficient light at the center of the optical image system.

According to the optical image system of the present disclosure, the lens elements thereof can be made of glass or plastic materials. When the lens elements are made of glass materials, the distribution of the refractive power of the optical image system may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical image system. Therefore, the total track length of the optical image system can also be reduced.

According to the optical image system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the optical image system of the present disclosure, the refractive power or the focal length of a lens element being positive or negative may refer to the refractive power or the focal length in a paraxial region of the lens element.

According to the optical image system of the present disclosure, the optical image system can include at least one stop, such as an aperture stop, a glare stop or a field stop. Said glare stop or said field stop is for eliminating the stray light and thereby improving the image resolution thereof.

According to the optical image system of the present disclosure, the image surface of the optical image system, based on the corresponding image sensor, can be flat or curved. In particular, the image surface can be a curved surface being concave facing towards the object side.

According to the optical image system of the present disclosure, an aperture stop can be configured as a middle stop. A middle stop disposed between the first lens element and the image surface is favorable for enlarging the field of view of the optical image system and thereby provides a wider field of view for the same.

According to the optical image system of the present disclosure, the optical image system can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned optical image system and an image sensor, wherein the image sensor is disposed on the image side of the aforementioned optical image system, that is, the image sensor can be disposed on or near the image surface of the aforementioned optical image system. By the arrangement of the refractive power of the second lens element and the third lens element, aberrations of the first lens element can be eliminated. The aberration overcorrection by excessive refractive power of the second lens element or the third lens element and the insufficient aberration correction from lacking refractive power thereof can be both avoided. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2:
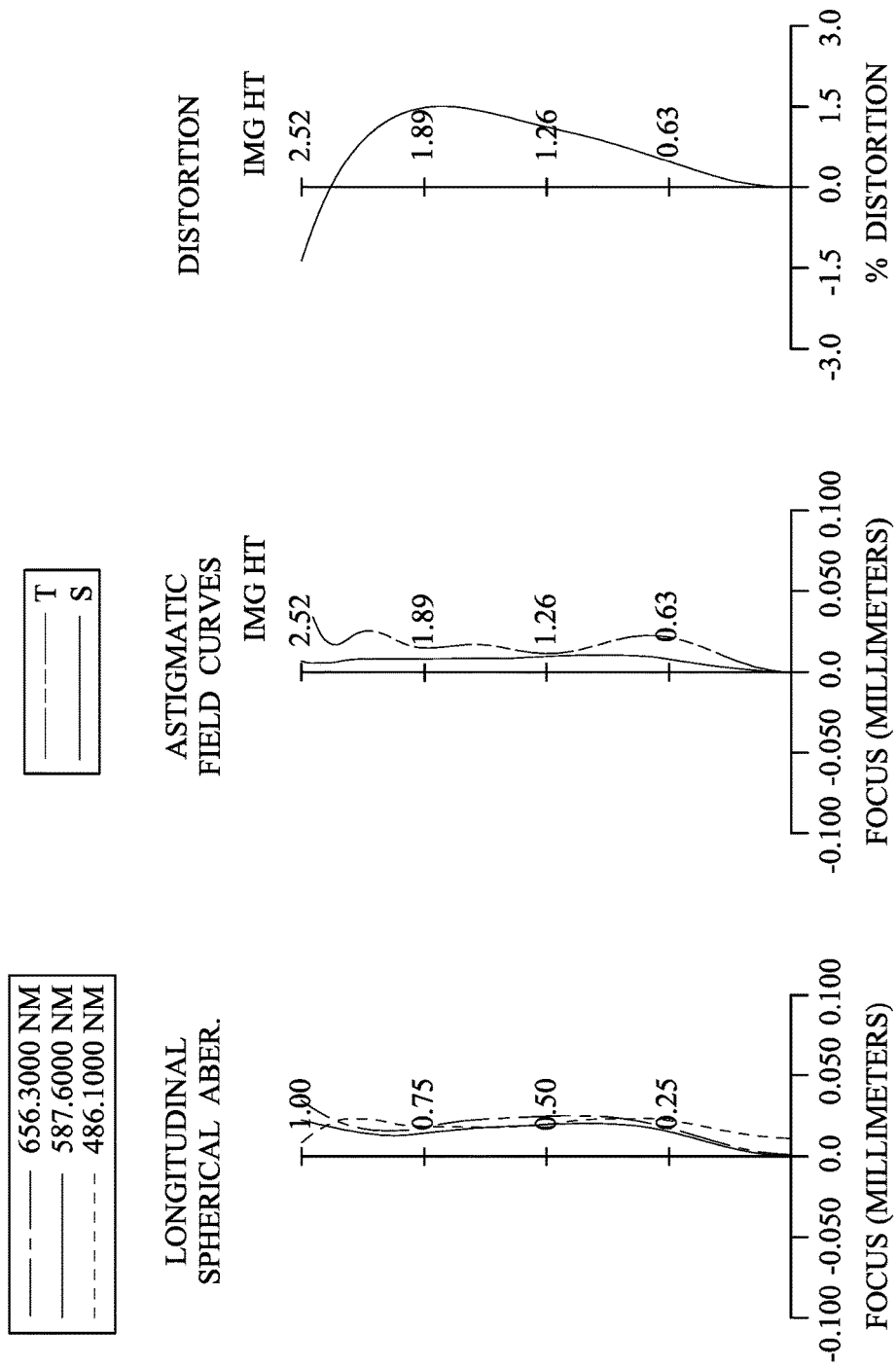
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an optical image system (its reference numeral is omitted) and an image sensor 190. The optical image system includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the image sensor 190 is disposed on the image surface 180 of the optical image system. The optical image system has a total of six lens elements (110-160), and there is an air space between every two lens elements of the first lens element 110, the second lens element 120, the third lens element 130, the fourth lens element 140, the fifth lens element 150 and the sixth lens element 160 that are adjacent to each other.

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric. Furthermore, each of the object-side surface 151 and the image-side surface 152 of the fifth lens element 150 includes at least one inflection point.

The sixth lens element 160 with negative refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, each of the object-side surface 161 and the image-side surface 162 of the sixth lens element 160 includes at least one inflection point.

The IR-cut filter 170 is made of a glass material and located between the sixth lens element 160 and the image surface 180, and will not affect the focal length of the optical image system.

The equation of the aspheric surface profiles of the aforementioned lens elements of the 1st embodiment is expressed as follows:

$$X(Y)=(Y^2/R)/(1+\text{sqrt}(1-(1+k)\times(Y/R)^2))+\sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical image system according to the 1st embodiment, when a focal length of the optical image system is f, an entrance pupil diameter of the optical image system is EPD, and half of a maximum field of view of the optical image system is HFOV, these parameters have the following values: f=6.15 mm; f/EPD=2.55; and HFOV=22.5 degrees.

In the optical image system according to the 1st embodiment, when an Abbe number of the second lens element 120 is V2, an Abbe number of the third lens element 130 is V3, and an Abbe number of the fourth lens element 140 is V4, the following condition is satisfied: V2+V3+V4=64.3.

In the optical image system according to the 1st embodiment, when a central thickness of the first lens element 110 is CT1, and an axial distance between the image-side surface 162 of the sixth lens element 160 and the image surface 180 is BL, the following condition is satisfied: CT1/BL=0.74.

Figure 19:
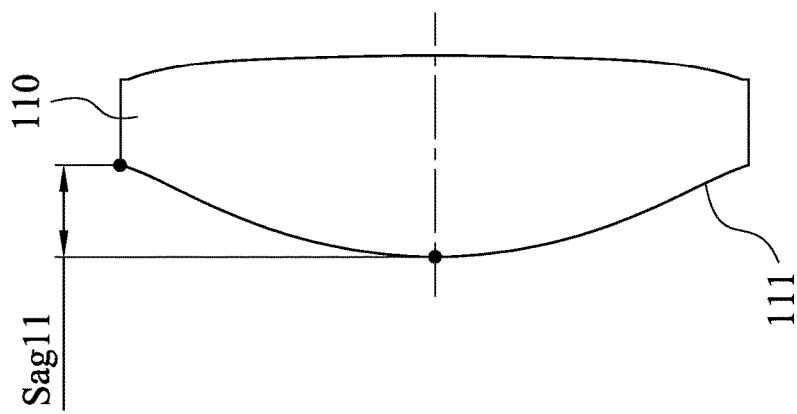
FIG. 19 shows a schematic view of a parameter Sag11 according to the 1st embodiment of FIG. 1.

FIG. 19 shows a schematic view of a parameter Sag11 according to the 1st embodiment of FIG. 1. In FIG. 19, the central thickness of the first lens element 110 is CT1, and a distance in parallel with an optical axis from an axial vertex on the object-side surface 111 of the first lens element 110 to a maximum effective radius position on the object-side surface 111 of the first lens element 110 is Sag11 (when the measuring of the distance begins from one point projecting towards the image side, Sag11 is positive; when the measuring of the distance projects towards the object side, Sag11 is negative), the following condition is satisfied: CT1/Sag11=2.20.

In the optical image system according to the 1st embodiment, when the central thickness of the first lens element 110 is CT1, a central thickness of the second lens element 120 is CT2, a central thickness of the third lens element 130 is CT3, a central thickness of the fourth lens element 140 is CT4, and a central thickness of the fifth lens element 150 is CT5, the following condition is satisfied: (CT2+CT3+CT4+CT5)/CT1=2.53.

In the optical image system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following conditions are satisfied: (T45+T56)/(T12+T23+T34)=1.50; and T56/(T12+T23+T34+T45)=1.36

In the optical image system according to the 1st embodiment, when a maximum optical effective radius of the object-side surface 111 of the first lens element 110 is Y11, and a maximum optical effective radius of the image-side surface 132 of the third lens element 130 is Y32, the following condition is satisfied: Y11/Y32=1.44.

In the optical image system according to the 1st embodiment, when the focal length of the optical image system is f, and a maximum image height of the optical image system is ImgH (half of a diagonal length of an effective photosensitive area of the image sensor 190), the following condition is satisfied: f/ImgH=2.44.

In the optical image system according to the 1st embodiment, when a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: f1/f3=−0.39; f1/f4=0.28; f3/f2=1.01; and f5/f6=1.25.

In the optical image system according to the 1st embodiment, when the focal length of the optical image system is f, the focal length of the first lens element 110 is f1, the focal length of the second lens element 120 is f2, the focal length of the third lens element 130 is f3, the focal length of the fourth lens element 140 is f4, the focal length of the fifth lens element 150 is f5, and the focal length of the sixth lens element 160 is f6, the following condition is satisfied: Σ|f/fx|=5.12, wherein x=1, 2, 3, 4, 5, 6.

The detailed optical data of the 1st embodiment are shown in Table 1 and the aspheric surface data are shown in Table 2 below.

TABLE 1

1st Embodiment
f = 6.15 mm, Fno = 2.55, HFOV = 22.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.349 | | | | |
| 2 | Lens 1 | 1.909 | ASP | 0.774 | Plastic | 1.545 | 56.1 | 3.07 |
| 3 | | −11.528 | ASP | 0.113 | | | | |
| 4 | Lens 2 | −98.591 | ASP | 0.855 | Plastic | 1.660 | 20.4 | −7.76 |
| 5 | | 5.421 | ASP | 0.212 | | | | |
| 6 | Lens 3 | 64.655 | ASP | 0.449 | Plastic | 1.639 | 23.5 | −7.80 |
| 7 | | 4.610 | ASP | 0.368 | | | | |
| 8 | Lens 4 | 100.000 | ASP | 0.403 | Plastic | 1.660 | 20.4 | 10.86 |
| 9 | | −7.710 | ASP | 0.040 | | | | |
| 10 | Lens 5 | −5.891 | ASP | 0.255 | Plastic | 1.639 | 23.5 | −14.29 |
| 11 | | −16.892 | ASP | 1.000 | | | | |
| 12 | Lens 6 | −5.969 | ASP | 0.572 | Plastic | 1.535 | 55.8 | −11.43 |
| 13 | | −254.834 | ASP | 0.500 | | | | |
| 14 | IR-cut filter | Plano | | 0.210 | Glass | 1.517 | 64.2 | — |
| 15 | | Plano | | 0.329 | | | | |
| 16 | Image | Plano | | — | | | | |

Reference wavelength is 587.6 nm (d-line).
Effective radius of Surface 5 is 0.935 mm.
Effective radius of Surface 11 is 1.360 mm.

TABLE 2

Aspheric Coefficients

| Surface # | 2 | 3 | 4 | 5 | 6 | 7 |
|---|---|---|---|---|---|---|
| k = | −5.7570E−01 | −6.7134E+01 | 9.0000E+01 | 1.2779E+01 | −9.0000E+01 | −2.7254E+00 |
| A4 = | 4.0865E−03 | 5.0686E−02 | 5.7761E−02 | −3.2567E−02 | −4.6863E−02 | 1.2090E−02 |
| A6 = | 1.0246E−03 | −8.5392E−02 | −8.2010E−02 | −4.9378E−02 | 6.5028E−03 | −3.9087E−02 |
| A8 = | −1.2208E−02 | 3.7548E−02 | 5.5698E−02 | 2.3772E−01 | 2.3407E−01 | 2.9919E−01 |
| A10 = | 6.3579E−03 | −1.0038E−02 | −3.2607E−03 | −1.5529E−01 | 9.8307E−02 | −1.7063E−01 |
| A12 = | −4.8276E−03 | 1.1880E−04 | −7.6348E−03 | 8.7481E−02 | −5.8714E−01 | −4.5285E−03 |
| A14 = | | | 2.5580E−03 | −3.5190E−02 | 5.2450E−01 | |
| A16 = | | | | | −1.6143E−01 | |

| Surface # | 8 | 9 | 10 | 11 | 12 | 13 |
|---|---|---|---|---|---|---|
| k = | −9.0000E+01 | −6.5068E+01 | 2.1438E+01 | 9.0000E+01 | −6.6640E+01 | −9.0000E+01 |
| A4 = | −4.0728E−02 | −3.4885E−01 | −6.5802E−01 | −3.5387E−01 | −2.0060E−01 | −1.1384E−01 |
| A6 = | −6.0745E−02 | 8.3764E−01 | 1.6025E+00 | 7.1454E−01 | 6.1884E−02 | 2.9945E−02 |
| A8 = | −5.3838E−01 | −1.3378E+00 | −1.2700E+00 | −6.7174E−01 | 2.2348E−02 | −3.4773E−04 |
| A10 = | 9.2363E−01 | 1.1575E+00 | −2.0080E−03 | 5.0521E−01 | −1.5234E−02 | −1.5570E−03 |
| A12 = | −4.0646E−01 | −4.8698E−01 | 7.1327E−01 | −3.0205E−01 | 2.9337E−03 | 2.2703E−04 |
| A14 = | | 5.3813E−02 | −4.8885E−01 | 1.0573E−01 | −1.7927E−04 | 1.1679E−05 |
| A16 = | | 1.0893E−02 | 1.1010E−01 | −1.5101E−02 | −3.1402E−06 | −2.7060E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Furthermore, according to the 1st embodiment, numbers of the inflection points of each object-side surface (151, 161) and each image-side surface (152, 162) of the fifth lens element 150 and the sixth lens element 160 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 151 | 152 | 161 | 162 |
| Number of inflection points | 2 | 2 | 1 | 1 |

2nd Embodiment

Figure 3:
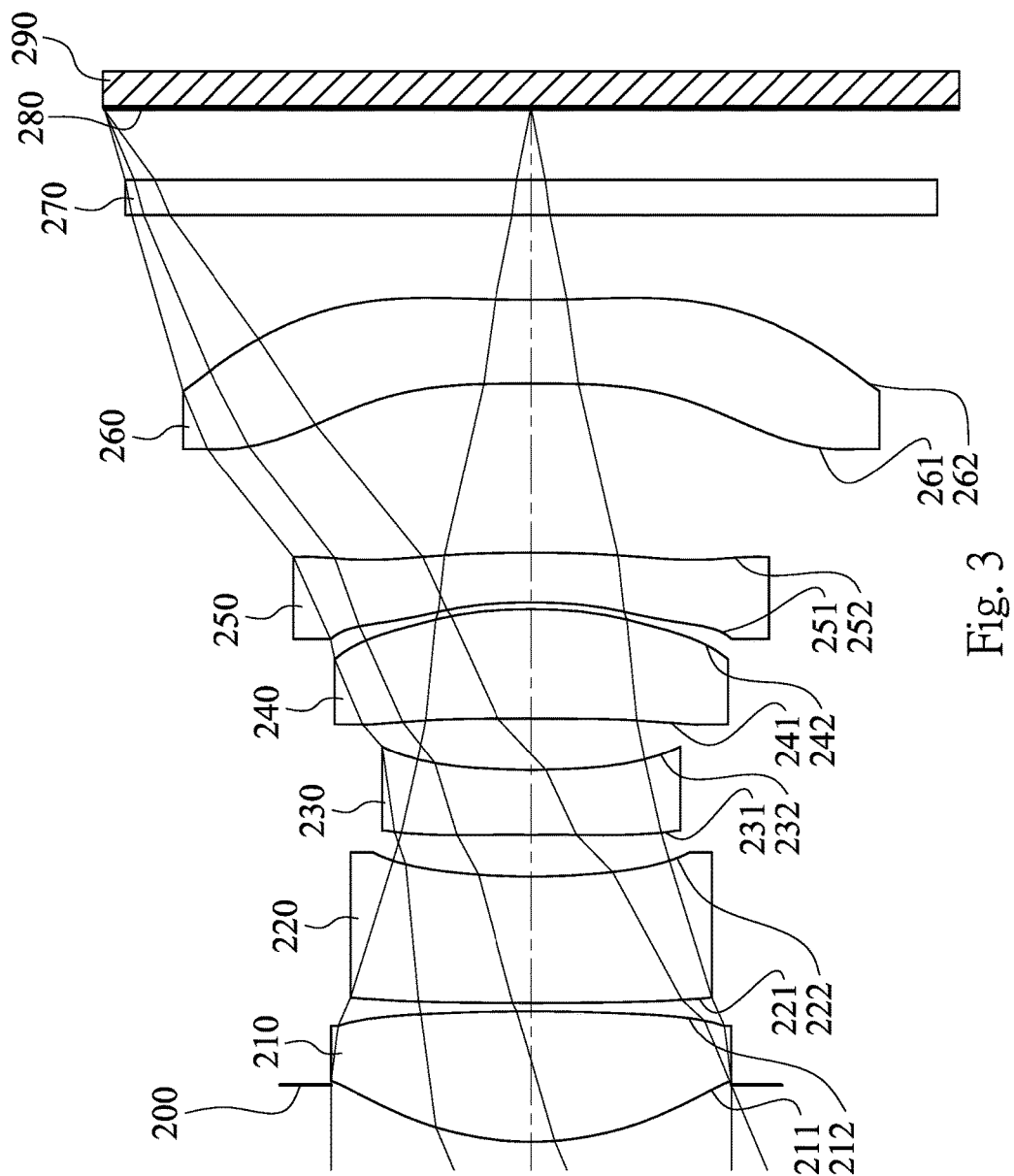
FIG. 3 is a schematic view of an image capturing device according to the 2nd embodiment of the present disclosure.
Figure 4:
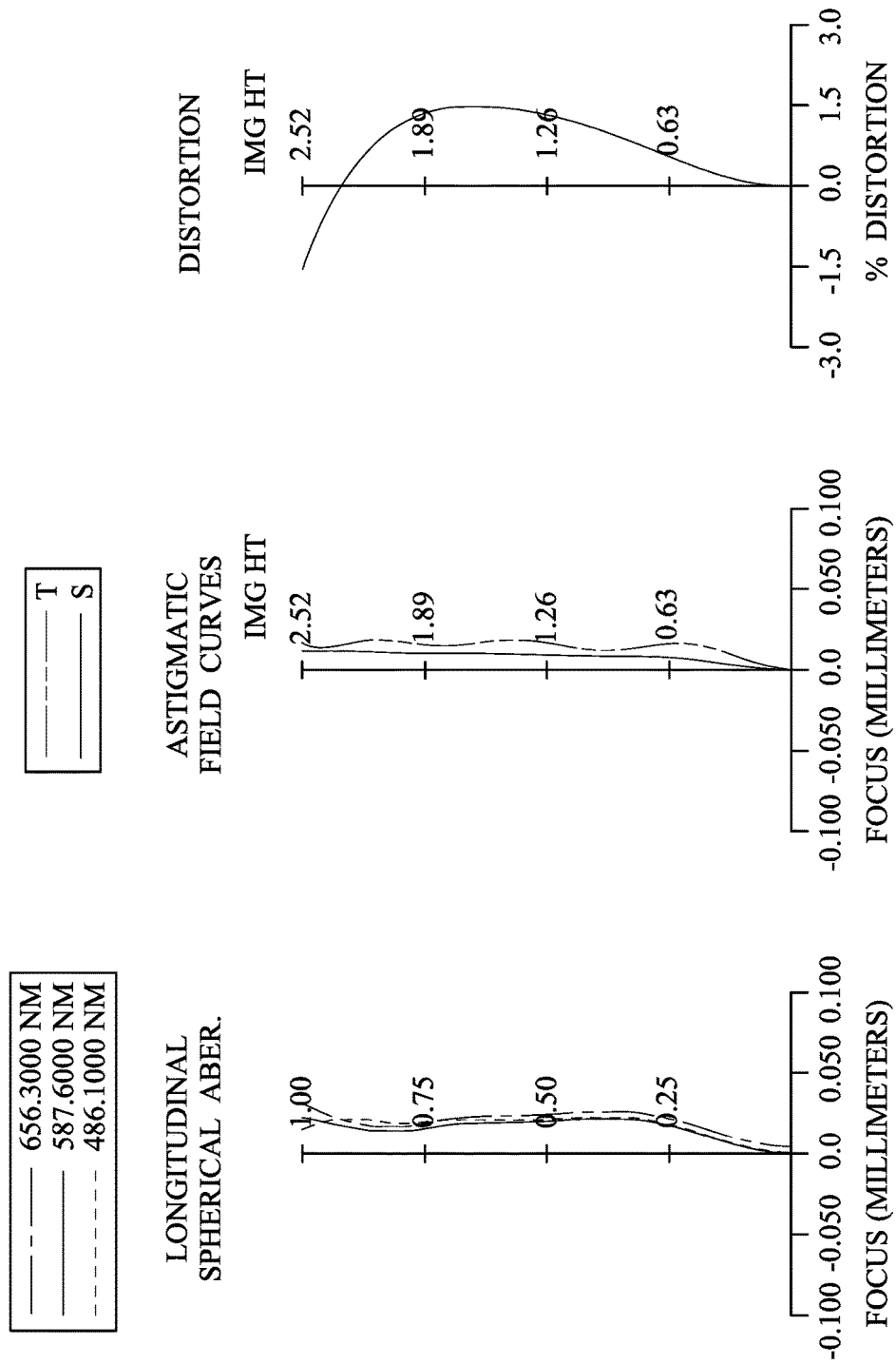
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an optical image system (its reference numeral is omitted) and an image sensor 290. The optical image system includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280, wherein the image sensor 290 is disposed on the image surface 280 of the optical image system. The optical image system has a total of six lens elements (210-260), and there is an air space between every two lens elements of the first lens element 210, the second lens element 220, the third lens element 230, the fourth lens element 240, the fifth lens element 250 and the sixth lens element 260 that are adjacent to each other.

The first lens element 210 with positive refractive power has an object-side surface 211 being convex in a paraxial region thereof and an image-side surface 212 being convex in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric. Furthermore, each of the object-side surface 251 and the image-side surface 252 of the fifth lens element 250 includes at least one inflection point.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, each of the object-side surface 261 and the image-side surface 262 of the sixth lens element 260 includes at least one inflection point.

The IR-cut filter 270 is made of a glass material and located between the sixth lens element 260 and the image surface 280, and will not affect the focal length of the optical image system.

The detailed optical data of the 2nd embodiment are shown in Table 3 and the aspheric surface data are shown in Table 4 below.

TABLE 3

2nd Embodiment
f = 6.01 mm, Fno = 2.55, HFOV = 23.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.334 | | | | |
| 2 | Lens 1 | 1.879 | ASP | 0.772 | Plastic | 1.545 | 56.1 | 3.05 |
| 3 | | −12.388 | ASP | 0.049 | | | | |
| 4 | Lens 2 | 25.111 | ASP | 0.744 | Plastic | 1.639 | 23.5 | −7.19 |
| 5 | | 3.836 | ASP | 0.246 | | | | |
| 6 | Lens 3 | 60.243 | ASP | 0.383 | Plastic | 1.639 | 23.5 | −7.06 |
| 7 | | 4.183 | ASP | 0.305 | | | | |
| 8 | Lens 4 | −500.000 | ASP | 0.645 | Plastic | 1.639 | 23.5 | 6.25 |
| 9 | | −3.961 | ASP | 0.040 | | | | |
| 10 | Lens 5 | −4.680 | ASP | 0.293 | Plastic | 1.639 | 23.5 | −10.94 |
| 11 | | −14.527 | ASP | 1.000 | | | | |
| 12 | Lens 6 | −18.447 | ASP | 0.492 | Plastic | 1.514 | 56.8 | −9.41 |
| 13 | | 6.611 | ASP | 0.500 | | | | |
| 14 | IR-cut filter | Plano | | 0.210 | Glass | 1.517 | 64.2 | — |
| 15 | | Plano | | 0.424 | | | | |
| 16 | Image | Plano | | — | | | | |

Reference wavelength is 587.6 nm (d-line).
Effective radius of Surface 5 is 0.935 mm.
Effective radius of Surface 11 is 1.400 mm.

TABLE 4

Aspheric Coefficients

| Surface # | 2 | 3 | 4 | 5 | 6 | 7 |
|---|---|---|---|---|---|---|
| k = | −4.7361E−01 | −6.7134E+01 | 9.0000E+01 | 1.2779E+01 | −9.0000E+01 | −2.7254E+00 |
| A4 = | 3.2789E−03 | −1.7375E−03 | −1.4716E−02 | −9.9180E−02 | −9.4344E−02 | −4.2733E−02 |
| A6 = | 6.1937E−03 | 1.3509E−02 | 4.3774E−02 | 9.8873E−02 | 2.6538E−01 | 2.4995E−01 |
| A8 = | −2.0582E−02 | −3.8500E−02 | −4.3649E−02 | 8.6428E−02 | −3.7043E−02 | −8.1827E−02 |
| A10 = | 1.6543E−02 | 1.5788E−02 | 2.5779E−02 | −2.0130E−01 | −2.3827E−01 | −7.1859E−02 |

TABLE 4-continued

| Aspheric Coefficients | | | | | | |
|---|---|---|---|---|---|---|
| A12 = | −8.9338E−03 | −3.1256E−03 | −8.5216E−03 | 1.7972E−01 | 2.6398E−01 | 3.6913E−02 |
| A14 = | | | 2.6435E−03 | −8.6879E−02 | −1.5619E−01 | |
| A16 = | | | | | 4.0020E−02 | |

| Surface # | 8 | 9 | 10 | 11 | 12 | 13 |
|---|---|---|---|---|---|---|
| k = | −9.0000E+01 | −6.5068E+01 | 1.3174E+01 | 9.0000E+01 | −6.6640E+01 | −9.0000E+01 |
| A4 = | −8.3157E−02 | −5.5748E−01 | −5.5164E−01 | −1.6790E−01 | −1.5496E−01 | −9.1233E−02 |
| A6 = | 3.5645E−02 | 1.1451E+00 | 1.4086E+00 | 4.0281E−01 | 6.0026E−02 | 2.5353E−02 |
| A8 = | 2.7011E−02 | −1.1032E+00 | −1.3827E+00 | −5.0047E−01 | −1.3852E−02 | −6.3763E−03 |
| A10 = | −3.9344E−02 | 3.9205E−01 | 5.5993E−01 | 4.5439E−01 | 7.6125E−03 | 2.0891E−03 |
| A12 = | 2.7099E−02 | 1.2493E−01 | 7.4155E−02 | −2.6034E−01 | −3.0434E−03 | −6.9352E−04 |
| A14 = | | −1.5966E−01 | −1.5038E−01 | 7.8994E−02 | 5.4290E−04 | 1.2721E−04 |
| A16 = | | 4.0932E−02 | 3.7599E−02 | −9.6111E−03 | −3.5481E−05 | −8.5886E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.01 | T56/(T12 + T23 + T34 + T45) | 1.56 |
| f/EPD | 2.55 | Y11/Y32 | 1.34 |
| HFOV [deg.] | 23.0 | f/ImgH | 2.38 |
| V2 + V3 + V4 | 70.5 | f1/f3 | −0.43 |
| CT1/BL | 0.68 | f1/f4 | 0.49 |
| CT1/Sag11 | 2.15 | f3/f2 | 0.98 |
| (CT2 + CT3 + CT4 + CT5)/CT1 | 2.67 | f5/f6 | 1.16 |
| (T45 + T56)/(T12 + T23 + T34) | 1.73 | Σ|f/fx| | 5.81 |

Furthermore, according to the 2nd embodiment, numbers of the inflection points of each object-side surface (251, 261) and each image-side surface (252, 262) of the fifth lens element 250 and the sixth lens element 260 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 251 | 252 | 261 | 262 |
| Number of inflection points | 2 | 2 | 1 | 2 |

3rd Embodiment

Figure 5:
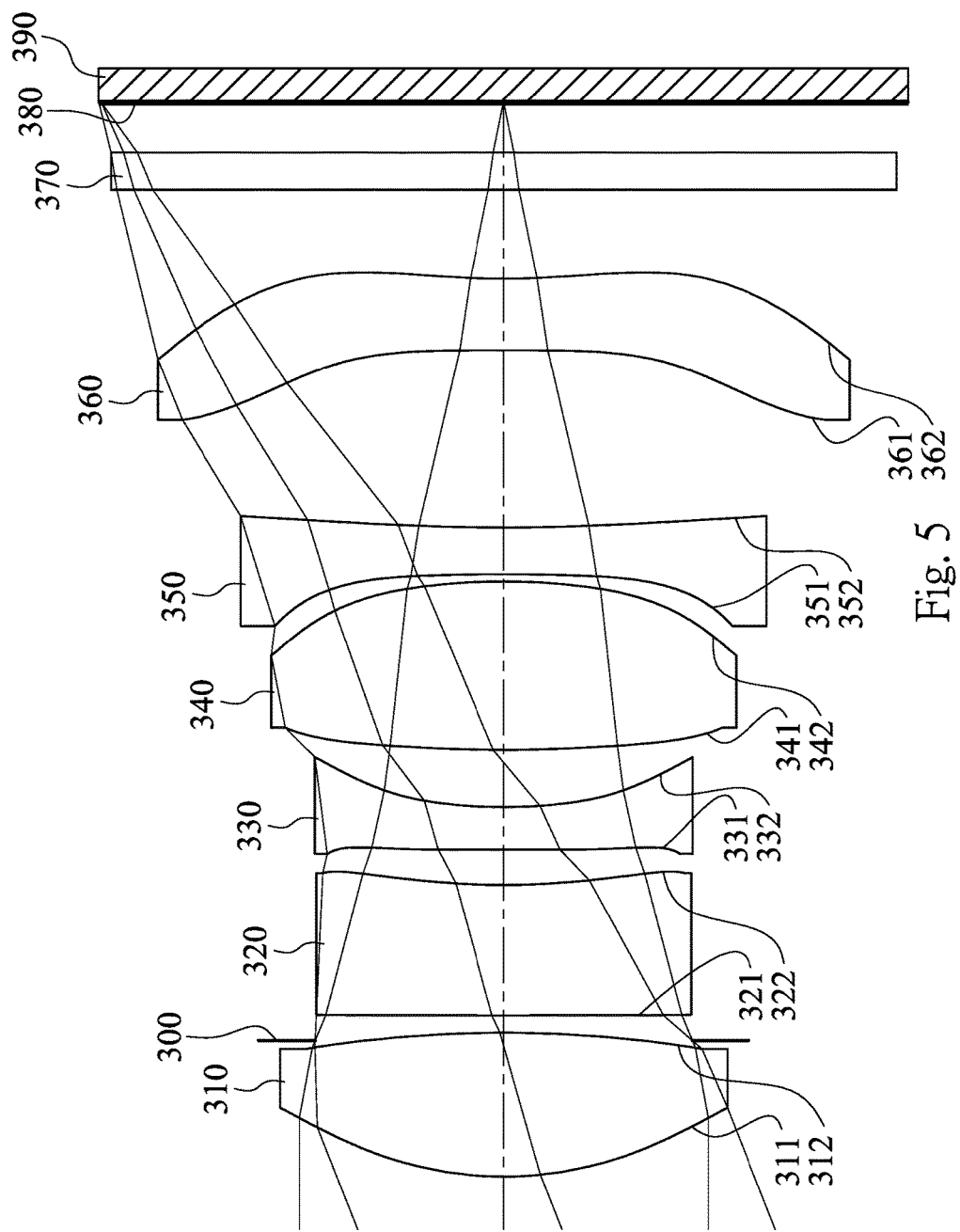
FIG. 5 is a schematic view of an image capturing device according to the 3rd embodiment of the present disclosure.
Figure 6:
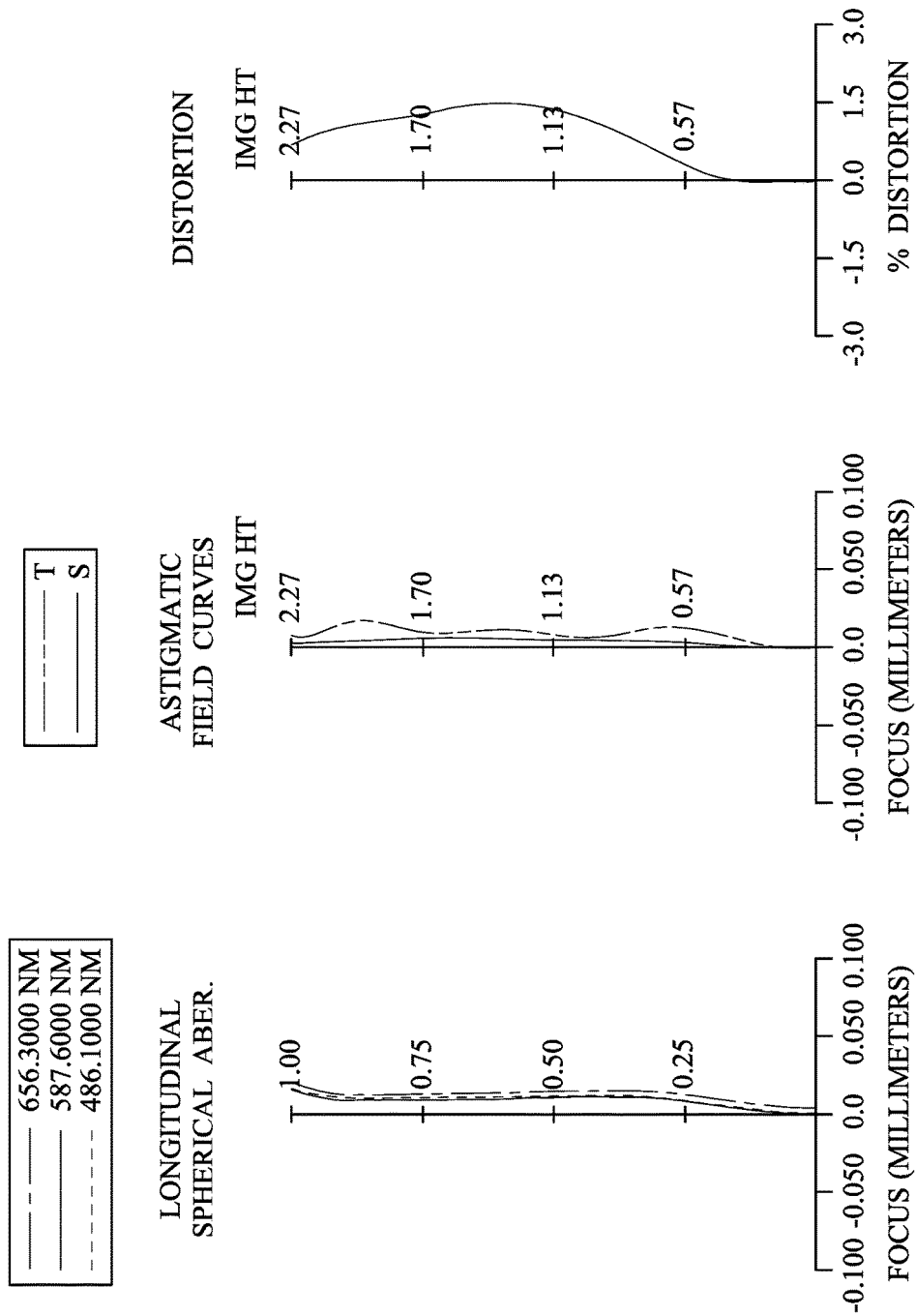
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an optical image system (its reference numeral is omitted) and an image sensor 390. The optical image system includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the optical image system. The optical image system has a total of six lens elements (310-360), and there is an air space between every two lens elements of the first lens element 310, the second lens element 320, the third lens element 330, the fourth lens element 340, the fifth lens element 350 and the sixth lens element 360 that are adjacent to each other.

The first lens element 310 with positive refractive power has an object-side surface 311 being convex in a paraxial region thereof and an image-side surface 312 being convex in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of a plastic material, and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of a plastic material, and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of a plastic material, and has the object-side surface 351 and the image-side surface 352 being both aspheric. Furthermore, the image-side surface 352 of the fifth lens element 350 includes at least one inflection point.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, each of the object-side surface 361 and the image-side surface 362 of the sixth lens element 360 includes at least one inflection point.

The IR-cut filter 370 is made of a glass material and located between the sixth lens element 360 and the image surface 380, and will not affect the focal length of the optical image system.

The detailed optical data of the 3rd embodiment are shown in Table 5 and the aspheric surface data are shown in Table 6 below.

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.71 | T56/(T12 + T23 + T34 + T45) | 1.52 |
| f/EPD | 2.48 | | |
| HFOV [deg.] | 21.5 | Y11/Y32 | 1.18 |
| V2 + V3 + V4 | 72.1 | f/ImgH | 2.52 |
| CT1/BL | 0.82 | f1/f3 | −0.66 |
| CT1/Sag11 | 2.09 | f1/f4 | 0.71 |
| (CT2 + CT3 + CT4 + CT5)/CT1 | 2.70 | f3/f2 | 0.62 |
| | | f5/f6 | 1.26 |

TABLE 5

3rd Embodiment
f = 5.71 mm, Fno = 2.48, HFOV = 21.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.048 ASP | 0.811 | Plastic | 1.544 | 55.9 | 2.95 |
| 2 | | −6.350 ASP | −0.045 | | | | |
| 3 | Ape. Stop | Plano | 0.141 | | | | |
| 4 | Lens 2 | 97.465 ASP | 0.738 | Plastic | 1.584 | 28.2 | −7.29 |
| 5 | | 4.071 ASP | 0.200 | | | | |
| 6 | Lens 3 | −40.817 ASP | 0.239 | Plastic | 1.660 | 20.4 | −4.49 |
| 7 | | 3.204 ASP | 0.322 | | | | |
| 8 | Lens 4 | 7.595 ASP | 0.951 | Plastic | 1.639 | 23.5 | 4.13 |
| 9 | | −3.843 ASP | 0.041 | | | | |
| 10 | Lens 5 | −10.667 ASP | 0.263 | Plastic | 1.639 | 23.5 | −9.77 |
| 11 | | 15.169 ASP | 1.000 | | | | |
| 12 | Lens 6 | 100.000 ASP | 0.404 | Plastic | 1.515 | 56.5 | −7.78 |
| 13 | | 3.842 ASP | 0.500 | | | | |
| 14 | IR-cut filter | Plano | 0.210 | Glass | 1.517 | 64.2 | — |
| 15 | | Plano | 0.281 | | | | |
| 16 | Image | Plano | — | | | | |

Reference wavelength is 587.6 nm (d-line).

TABLE 6

Aspheric Coefficients

| Surface # | 1 | 2 | 4 | 5 | 6 | 7 |
|---|---|---|---|---|---|---|
| k = | 2.2857E−01 | −6.7134E+01 | 9.0000E+01 | 1.2779E+01 | −9.0000E+01 | −2.7254E+00 |
| A4 = | −7.3717E−03 | −2.8461E−03 | 6.8087E−03 | −5.8402E−02 | 6.2217E−02 | 8.6996E−02 |
| A6 = | −1.9087E−03 | −2.9413E−02 | −5.3022E−02 | −5.6754E−02 | 4.8993E−02 | 1.5347E−01 |
| A8 = | −5.0346E−03 | 3.3842E−02 | 6.7998E−02 | 1.8697E−01 | −1.4463E−01 | −2.2148E−01 |
| A10 = | 1.5486E−03 | −1.7973E−02 | −2.5324E−02 | −2.9249E−01 | 1.3948E−01 | 8.8552E−02 |
| A12 = | −1.0236E−03 | 3.4189E−03 | −1.1036E−03 | 2.1121E−01 | −2.4904E−01 | −1.0975E−02 |
| A14 = | | | 2.2119E−03 | −9.2786E−02 | 2.4224E−01 | |
| A16 = | | | | | −1.1532E−01 | |

| Surface # | 8 | 9 | 10 | 11 | 12 | 13 |
|---|---|---|---|---|---|---|
| k = | −9.0000E+01 | −6.5068E+01 | 6.2978E+01 | 9.0000E+01 | −6.6640E+01 | −9.0000E+01 |
| A4 = | −2.5374E−02 | −1.2590E−01 | 7.1611E−02 | 3.1635E−02 | −1.6010E−01 | −2.1763E−02 |
| A6 = | 7.1185E−02 | 3.0115E−02 | −2.5572E−01 | −4.6334E−02 | 1.4707E−01 | −4.5760E−02 |
| A8 = | −7.0144E−02 | 2.8319E−02 | 3.2218E−01 | −4.3309E−02 | −1.7303E−01 | 3.1148E−02 |
| A10 = | 4.2304E−02 | −1.4039E−01 | −3.5585E−01 | 1.2157E−01 | 1.2273E−01 | −1.4583E−02 |
| A12 = | −8.5424E−03 | 1.6930E−01 | 2.9310E−01 | −9.2802E−02 | −4.4810E−02 | 5.0716E−03 |
| A14 = | | −9.0076E−02 | −1.4081E−01 | 3.0778E−02 | 8.1131E−03 | −1.0097E−03 |
| A16 = | | 1.8377E−02 | 2.7763E−02 | −3.8432E−03 | −5.8075E−04 | 8.1498E−05 |

-continued

| 3rd Embodiment | | | |
|---|---|---|---|
| (T45 + T56)/(T12 + T23 + T34) | 1.68 | Σ\|f/fx\| | 6.69 |

Furthermore, according to the 3rd embodiment, numbers of the inflection points of each object-side surface (351, 361) and each image-side surface (352, 362) of the fifth lens element 350 and the sixth lens element 360 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 351 | 352 | 361 | 362 |
| Number of inflection points | 0 | 1 | 2 | 2 |

4th Embodiment

Figure 7:
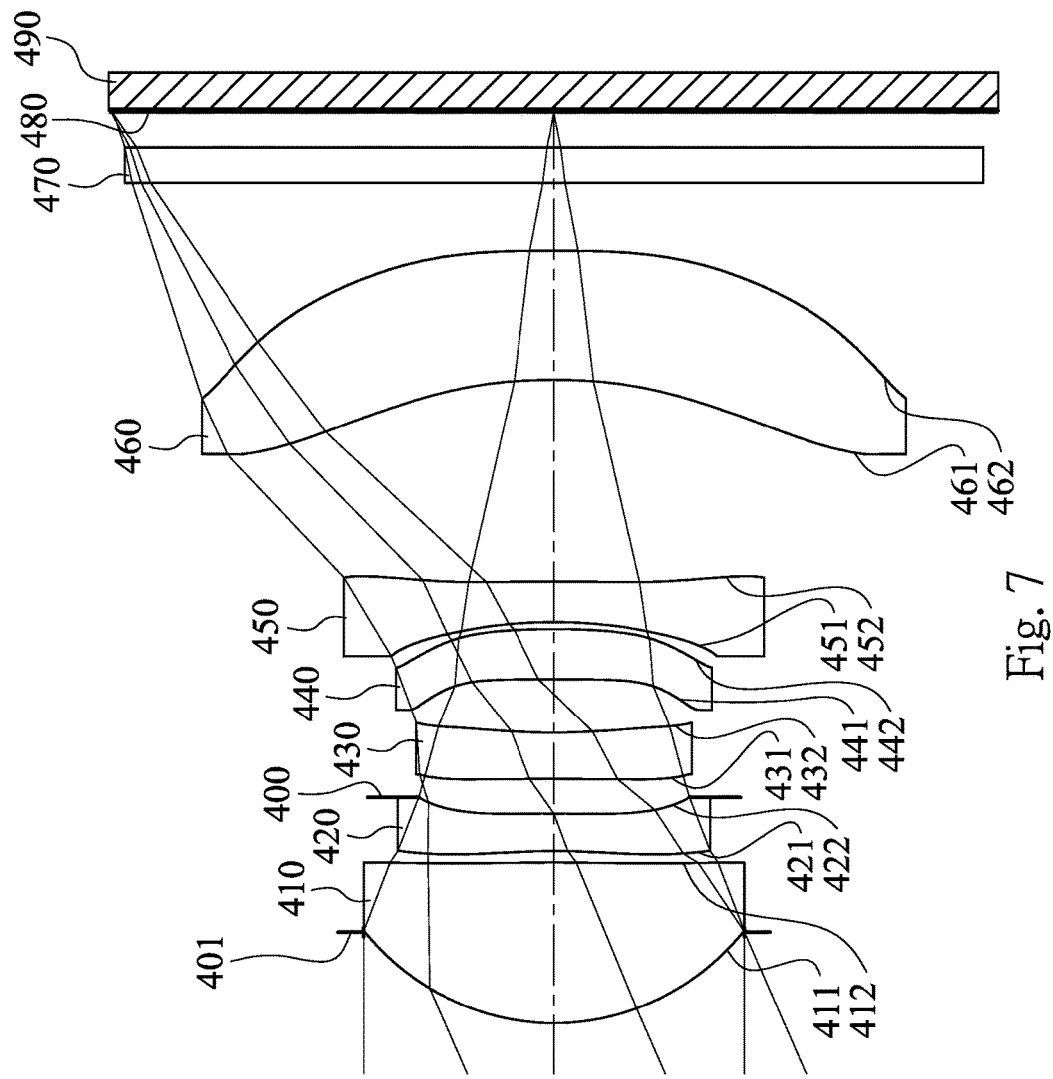
FIG. 7 is a schematic view of an image capturing device according to the 4th embodiment of the present disclosure.
Figure 8:
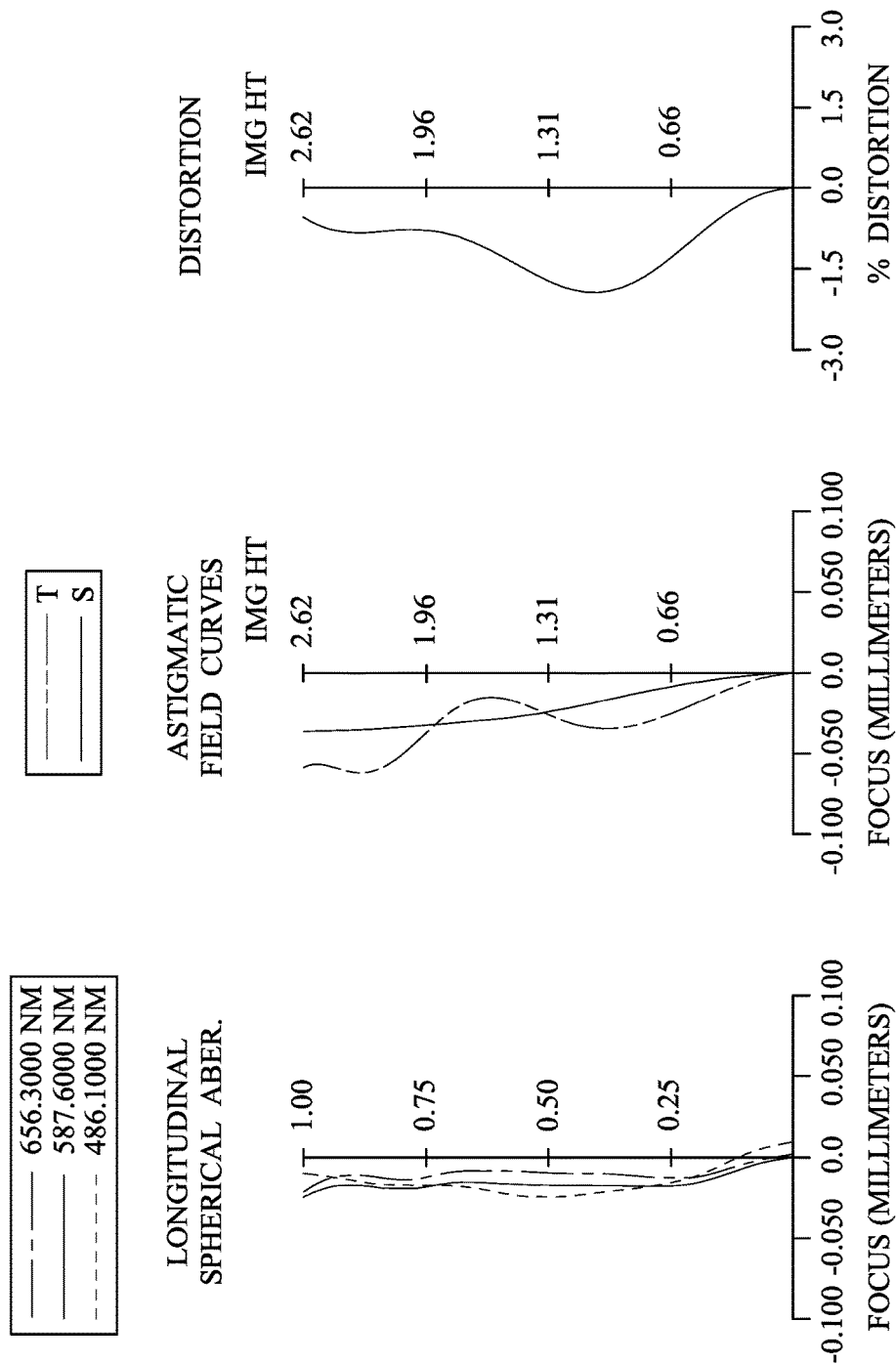
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an optical image system (its reference numeral is omitted) and an image sensor 490. The optical image system includes, in order from an object side to an image side, a stop 401, a first lens element 410, a second lens element 420, an aperture stop 400, a third lens element 430, a fourth lens element 440, a fifth lens element 450, a sixth lens element 460, an IR-cut filter 470 and an image surface 480, wherein the image sensor 490 is disposed on the image surface 480 of the optical image system. The optical image system has a total of six lens elements (410-460), and there is an air space between every two lens elements of the first lens element 410, the second lens element 420, the third lens element 430, the fourth lens element 440, the fifth lens element 450 and the sixth lens element 460 that are adjacent to each other. The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of a plastic material, and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least one inflection point.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point.

The IR-cut filter 470 is made of a glass material and located between the sixth lens element 460 and the image surface 480, and will not affect the focal length of the optical image system.

The detailed optical data of the 4th embodiment are shown in Table 7 and the aspheric surface data are shown in Table 8 below.

TABLE 7

4thEmbodiment
f= 6.04 mm, Fno = 2.69, HFOV = 23.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.538 | | | | |
| 2 | Lens 1 | 1.402 | ASP | 0.950 | Plastic | 1.544 | 55.9 | 2.34 |
| 3 | | −10.417 | ASP | 0.068 | | | | |
| 4 | Lens 2 | −3.159 | ASP | 0.220 | Plastic | 1.660 | 20.4 | −6.70 |
| 5 | Ape. Stop | −11.349 | ASP | 0.205 | | | | |
| 6 | Lens 3 | −79.372 | ASP | 0.274 | Plastic | 1.639 | 23.5 | −5.35 |
| 7 | | 3.577 | ASP | 0.317 | | | | |
| 8 | Lens 4 | −29.987 | ASP | 0.296 | Plastic | 1.660 | 20.4 | 10.82 |
| 9 | | −5.791 | ASP | 0.040 | | | | |
| 10 | Lens 5 | −4.597 | ASP | 0.240 | Plastic | 1.544 | 55.9 | −8.46 |
| 11 | | 50948.077 | ASP | 1.193 | | | | |
| 12 | Lens 6 | −3.453 | ASP | 0.762 | Plastic | 1.544 | 55.9 | −8.19 |

TABLE 7-continued

4thEmbodiment
f= 6.04 mm, Fno = 2.69, HFOV = 23.6 deg.

| Surface # | | Curvature Radius | Thickness | Material | Index | Abbe # | Focal Length |
|---|---|---|---|---|---|---|---|
| 13 | | −16.596 ASP | 0.400 | | | | |
| 14 | IR-cut filter | Plano | 0.210 | Glass | 1.517 | 64.2 | — |
| 15 | | Plano | 0.220 | | | | |
| 16 | Image | Plano | — | | | | |

Reference wavelength is 587.6 nm (d-ine).
Effective radius of Surface 1 is 1.124 mm.
Effective radius of Surface 11 is 1.240 mm.

TABLE 8

Aspheric Coefficients

| Surface # | 2 | 3 | 4 | 5 | 6 | 7 |
|---|---|---|---|---|---|---|
| k = | −2.6457E−01 | 4.7747E+01 | −9.0000E+01 | 1.5289E+01 | 2.4030E+01 | −1.0968E+01 |
| A4 = | 9.3476E−03 | 2.1279E−01 | 2.2047E−01 | 5.0024E−01 | 3.6323E−02 | −7.9371E−02 |
| A6 = | −3.5431E−03 | −5.0430E−01 | −4.4810E−01 | −1.4620E+00 | −6.3460E−01 | −5.5805E−01 |
| A8 = | 1.9851E−02 | 6.6589E−01 | 6.1627E−01 | 4.5079E+00 | 2.7155E+00 | 2.6966E+00 |
| A10 = | −2.0895E−02 | −4.0011E−01 | −2.2708E−01 | −8.3816E+00 | −4.2966E+00 | −6.7198E+00 |
| A12 = | 8.8661E−03 | 8.0360E−02 | −1.4500E−01 | 9.7058E+00 | 2.8678E+00 | 1.0992E+01 |
| A14 = | | | 5.8793E−02 | −4.9947E+00 | 1.1037E+00 | −1.0589E+01 |
| A16 = | | | | | −1.9722E+00 | 4.7382E+00 |

| Surface # | 8 | 9 | 10 | 11 | 12 | 13 |
|---|---|---|---|---|---|---|
| k = | −6.1906E+01 | −8.8802E+01 | 2.1000E+01 | 7.6378E+01 | −4.0573E+01 | −3.5331E+01 |
| A4 = | −1.0285E−01 | −5.2138E−01 | −7.4742E−01 | −2.2669E−01 | −2.3017E−01 | −1.6305E−01 |
| A6 = | −6.9297E−01 | 2.1611E+00 | 4.1361E+00 | 1.1924E+00 | 2.5368E−01 | 1.0135E−01 |
| A8 = | −4.0509E−02 | −8.8605E+00 | −1.2287E+01 | −2.3389E+00 | −1.5875E−01 | −3.4598E−02 |
| A10 = | 2.1208E+00 | 1.8645E+01 | 2.1316E+01 | 2.5390E+00 | 6.0433E−02 | 4.6459E−03 |
| A12 = | −5.1283E+00 | −2.1161E+01 | −2.0966E+01 | −1.6292E+00 | −1.3634E−02 | 3.7914E−04 |
| A14 = | 5.8240E+00 | 1.2487E+01 | 1.0563E+01 | 5.7743E−01 | 1.6882E−03 | −2.0255E−04 |
| A16 = | −1.8045E+00 | −2.9150E+00 | −2.0395E+00 | −8.7253E−02 | −8.8511E−05 | 1.9772E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.04 | T56/(T12 + T23 + T34 + T45) | 1.89 |
| f/EPD | 2.69 | | |
| HFOV [deg.] | 23.6 | Y11/Y32 | 1.38 |
| V2 + V3 + V4 | 64.3 | f/ImgH | 2.31 |
| CT1/BL | 1.14 | f1/f3 | −0.44 |
| CT1/Sag11 | 1.73 | f1/f4 | 0.22 |
| (CT2 + CT3 + CT4 + CT5)/CT1 | 1.08 | f3/f2 | 0.80 |
| | | f5/f6 | 1.03 |
| (T45 + T56)/(T12 + T23 + T34) | 2.09 | Σ|f/fx| | 6.62 |

Furthermore, according to the 4th embodiment, numbers of the inflection points of each object-side surface (451, 461) and each image-side surface (452, 462) of the fifth lens element 450 and the sixth lens element 460 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 451 | 452 | 461 | 462 |
| Number of inflection points | 0 | 3 | 1 | 1 |

5th Embodiment

Figure 9:
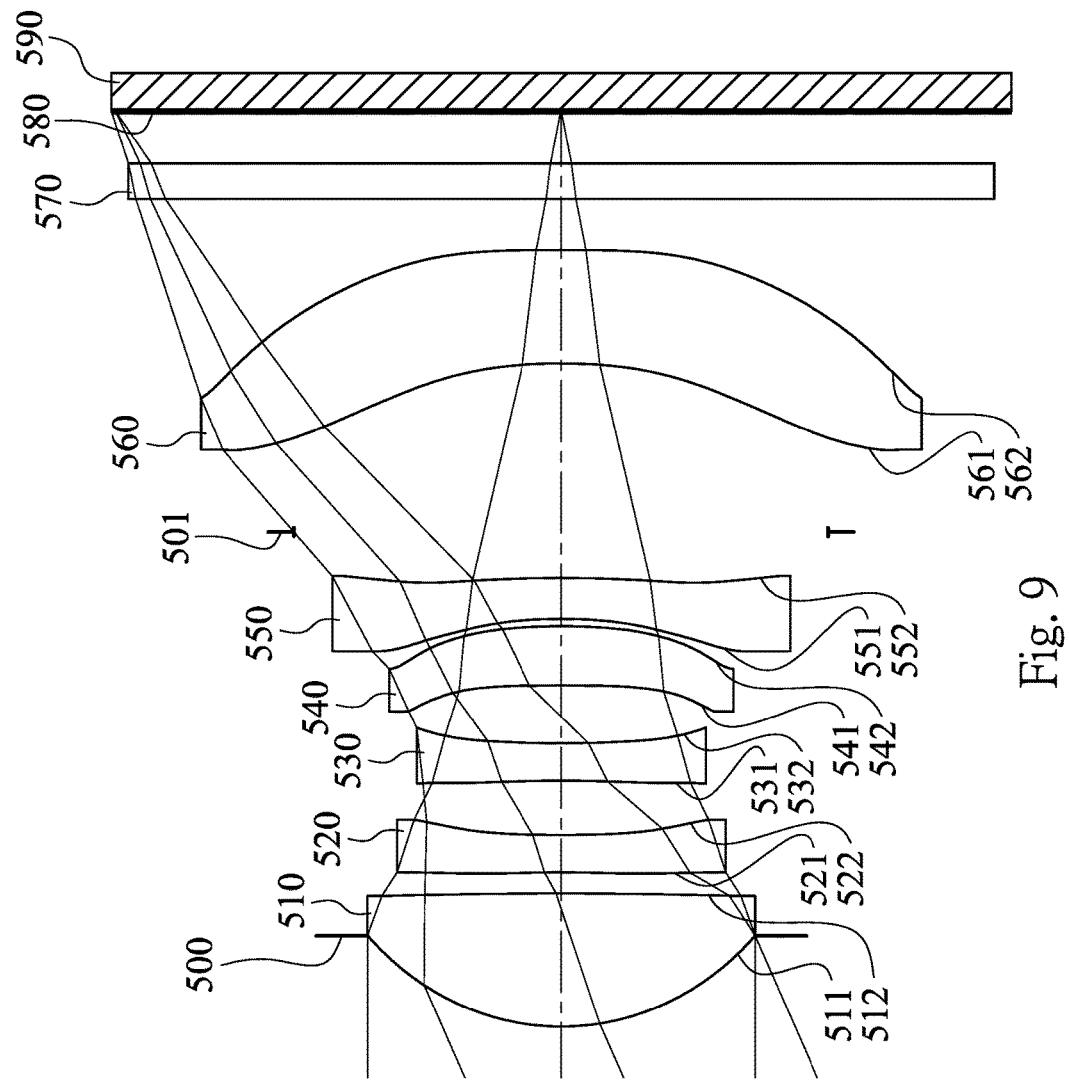
FIG. 9 is a schematic view of an image capturing device according to the 5th embodiment of the present disclosure.
Figure 10:
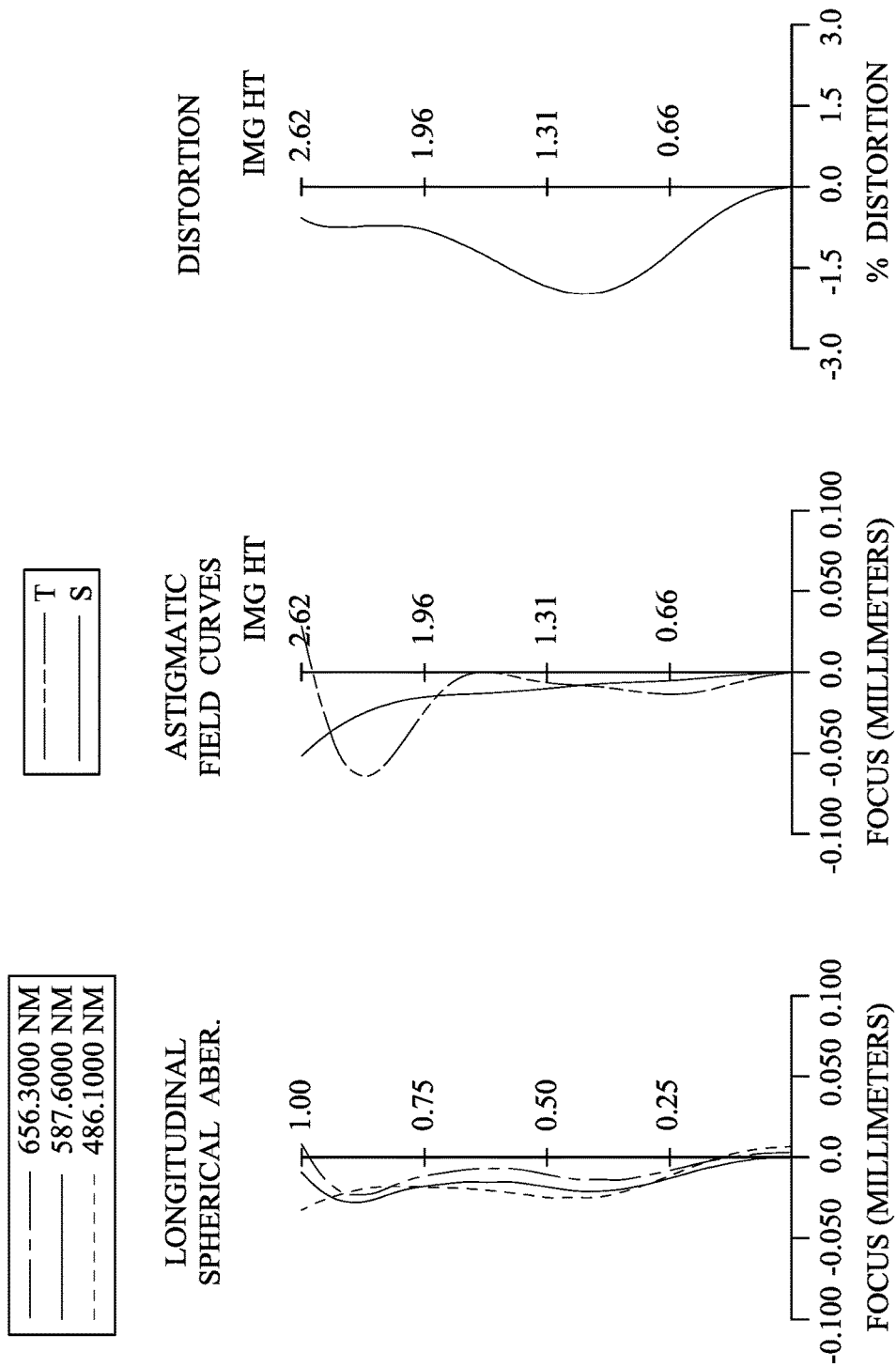
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an optical image system (its reference numeral is omitted) and an image sensor 590. The optical image system includes, in order from an object side to an image side, an aperture stop 500, a first lens element 510, a second lens element 520, a third lens element 530, a fourth lens element 540, a fifth lens element 550, a stop 501, a sixth lens element 560, an IR-cut filter 570 and an image surface 580, wherein the image sensor 590 is disposed on the image surface 580 of the optical image system. The optical image system has a total of six lens elements (510-560), and there is an air space between every two lens elements of the first lens element 510, the second lens element 520, the third lens element 530, the fourth lens element 540, the fifth lens element 550 and the sixth lens element 560 that are adjacent to each other.

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of a plastic material, and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of a plastic material, and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric. Furthermore, each of the object-side surface 551 and the image-side surface 552 of the fifth lens element 550 includes at least one inflection point.

The sixth lens element 560 with negative refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point.

The IR-cut filter 570 is made of a glass material and located between the sixth lens element 560 and the image surface 580, and will not affect the focal length of the optical image system.

The detailed optical data of the 5th embodiment are shown in Table 9 and the aspheric surface data are shown in Table 10 below.

TABLE 9

5th Embodiment
f=6.03 mm, Fno = 2.65, HFOV = 23.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.536 | | | | |
| 2 | Lens 1 | 1.441 | ASP | 0.786 | Plastic | 1.544 | 55.9 | 2.40 |
| 3 | | −11.219 | ASP | 0.123 | | | | |
| 4 | Lens 2 | −5.496 | ASP | 0.220 | Plastic | 1.660 | 20.4 | −6.43 |
| 5 | | 18.897 | ASP | 0.318 | | | | |
| 6 | Lens 3 | −7.644 | ASP | 0.220 | Plastic | 1.639 | 23.3 | −5.50 |
| 7 | | 6.581 | ASP | 0.342 | | | | |
| 8 | Lens 4 | −17.380 | ASP | 0.348 | Plastic | 1.660 | 20.4 | 8.28 |
| 9 | | −4.192 | ASP | 0.043 | | | | |
| 10 | Lens 5 | −3.652 | ASP | 0.240 | Plastic | 1.544 | 55.9 | −8.94 |
| 11 | | −15.019 | ASP | 0.270 | | | | |
| 12 | Stop | Plano | | 0.993 | | | | |
| 13 | Lens 6 | −3.648 | ASP | 0.666 | Plastic | 1.544 | 55.9 | −6.98 |
| 14 | | −100.000 | ASP | 0.300 | | | | |
| 15 | IR-cut filter | Plano | | 0.210 | Glass | 1.517 | 64.2 | — |
| 16 | | Plano | | 0.307 | | | | |
| 17 | Image | Plano | | — | | | | |

Reference wavelength is 587.6 nm (d-line).
Effective radius of Surface 12 is 1.570 mm.

TABLE 10

Aspheric Coefficients

| Surface # | 2 | 3 | 4 | 5 | 6 | 7 |
|---|---|---|---|---|---|---|
| k = | −3.7970E−01 | 4.7788E+01 | −8.9660E+01 | 1.5295E+01 | 2.3943E+01 | −1.1188E+01 |
| A4 = | 1.5197E−02 | 1.5368E−01 | 3.5394E−01 | 3.6785E−01 | 3.2620E−02 | −7.1469E−02 |
| A6 = | −5.2162E−03 | −2.9244E−01 | −8.5848E−01 | −7.1934E−01 | 1.9951E−01 | 2.0823E−01 |
| A8 = | 1.7813E−02 | 2.8322E−01 | 1.2360E+00 | 9.4009E−01 | −7.2350E−01 | 2.4484E−01 |
| A10 = | −1.5112E−02 | −1.3528E−01 | −1.1167E+00 | −3.9508E−01 | 3.3441E+00 | −4.0878E−01 |
| A12 = | 4.9246E−03 | 2.5964E−02 | 5.9986E−01 | −4.1336E−01 | −7.7716E+00 | 8.5258E−02 |
| A14 = | | | −1.5592E−01 | 2.5969E−01 | 8.2903E+00 | |
| A16 = | | | | | −3.6753E+00 | |

TABLE 10-continued

Aspheric Coefficients

| Surface # | 8 | 9 | 10 | 11 | 13 | 14 |
|---|---|---|---|---|---|---|
| k = | −6.1907E+01 | −8.9215E+01 | 9.2826E+00 | 8.1689E+01 | −4.0579E+01 | −3.5329E+01 |
| A4 = | −1.1057E−01 | −2.3091E−01 | −2.8343E−01 | −2.2854E−01 | −2.4705E−01 | −1.8495E−01 |
| A6 = | −5.3436E−01 | −8.8783E−01 | −4.2018E−01 | 6.8713E−01 | 2.1587E−01 | 1.0248E−01 |
| A8 = | 1.5763E+00 | 4.6774E+00 | 5.1135E+00 | −8.2420E−01 | −1.0934E+00 | −3.1473E−02 |
| A10 = | −2.4444E+00 | −9.6440E+00 | −1.2125E+01 | 5.9492E−01 | 3.6599E−02 | 3.9228E−03 |
| A12 = | 1.4109E+00 | 9.7380E+00 | 1.3293E+01 | −2.7674E−01 | −7.8216E−03 | 3.7195E−04 |
| A14 = | | −4.8655E+00 | −7.0505E+00 | 7.7990E−02 | 9.6675E−04 | −1.7925E−04 |
| A16 = | | 1.0317E+00 | 1.4746E+00 | −1.0271E−02 | −5.2190E−05 | 1.6845E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 6.03 | T56/(T12 + T23 + T34 + T45) | 1.53 |
|---|---|---|---|
| f/EPD | 2.65 | | |
| HFOV [deg.] | 23.7 | Y11/Y32 | 1.34 |
| V2 + V3 + V4 | 64.1 | f/ImgH | 2.30 |
| CT1/BL | 0.96 | f1/f3 | −0.44 |
| CT1/Sag11 | 1.46 | f1/f4 | 0.29 |
| (CT2 + CT3 + CT4 + CT5)/CT1 | 1.31 | f3/f2 | 0.86 |
| | | f5/f6 | 1.28 |
| (T45 + T56)/(T12 + T23 + T34) | 1.67 | Σ\|f/fx\| | 6.81 |

Furthermore, according to the 5th embodiment, numbers of the inflection points of each object-side surface (551, 561) and each image-side surface (552, 562) of the fifth lens element 550 and the sixth lens element 560 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 551 | 552 | 561 | 562 |
| Number of inflection points | 2 | 2 | 1 | 1 |

6th Embodiment

Figure 11:
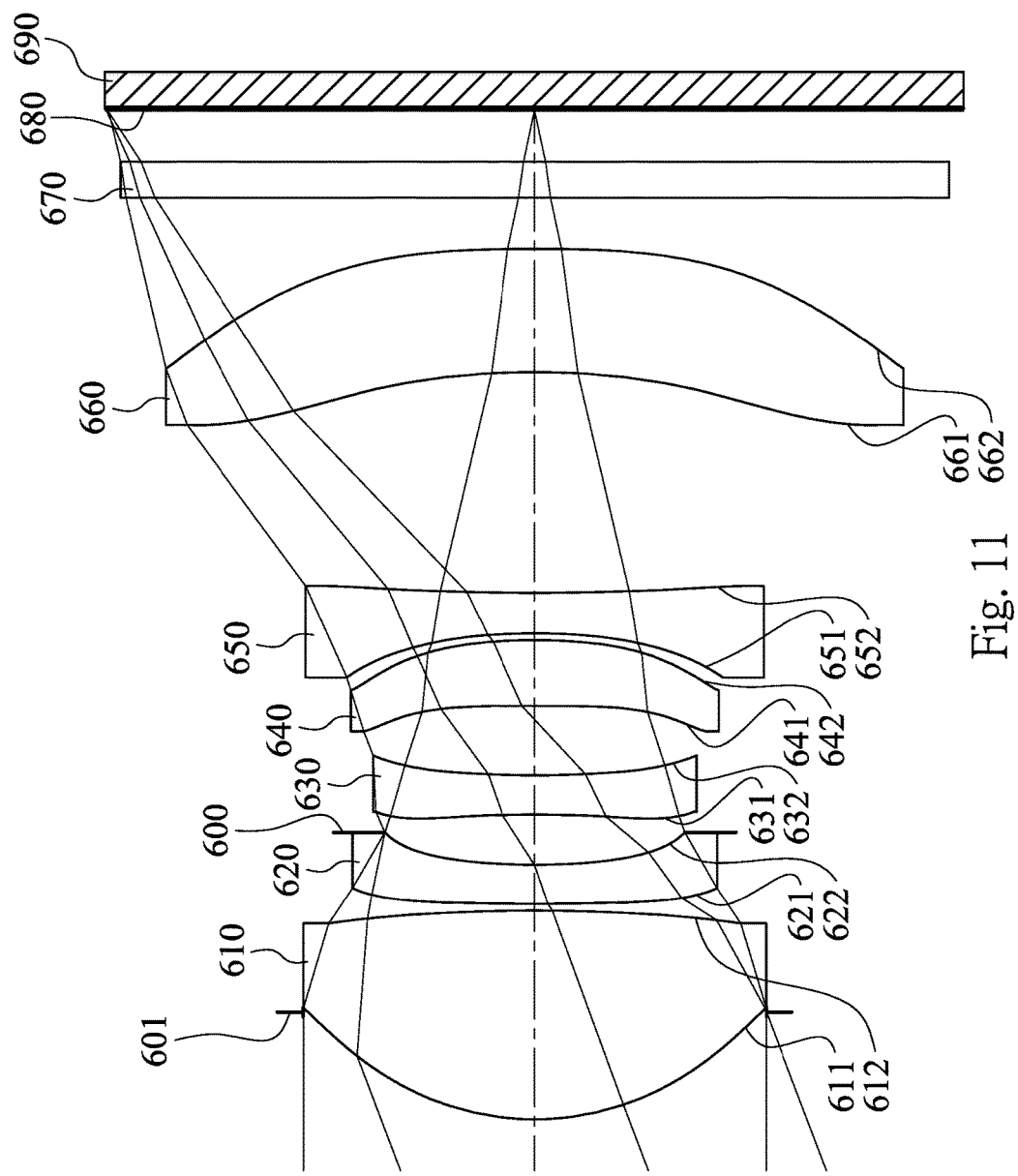
FIG. 11 is a schematic view of an image capturing device according to the 6th embodiment of the present disclosure.
Figure 12:
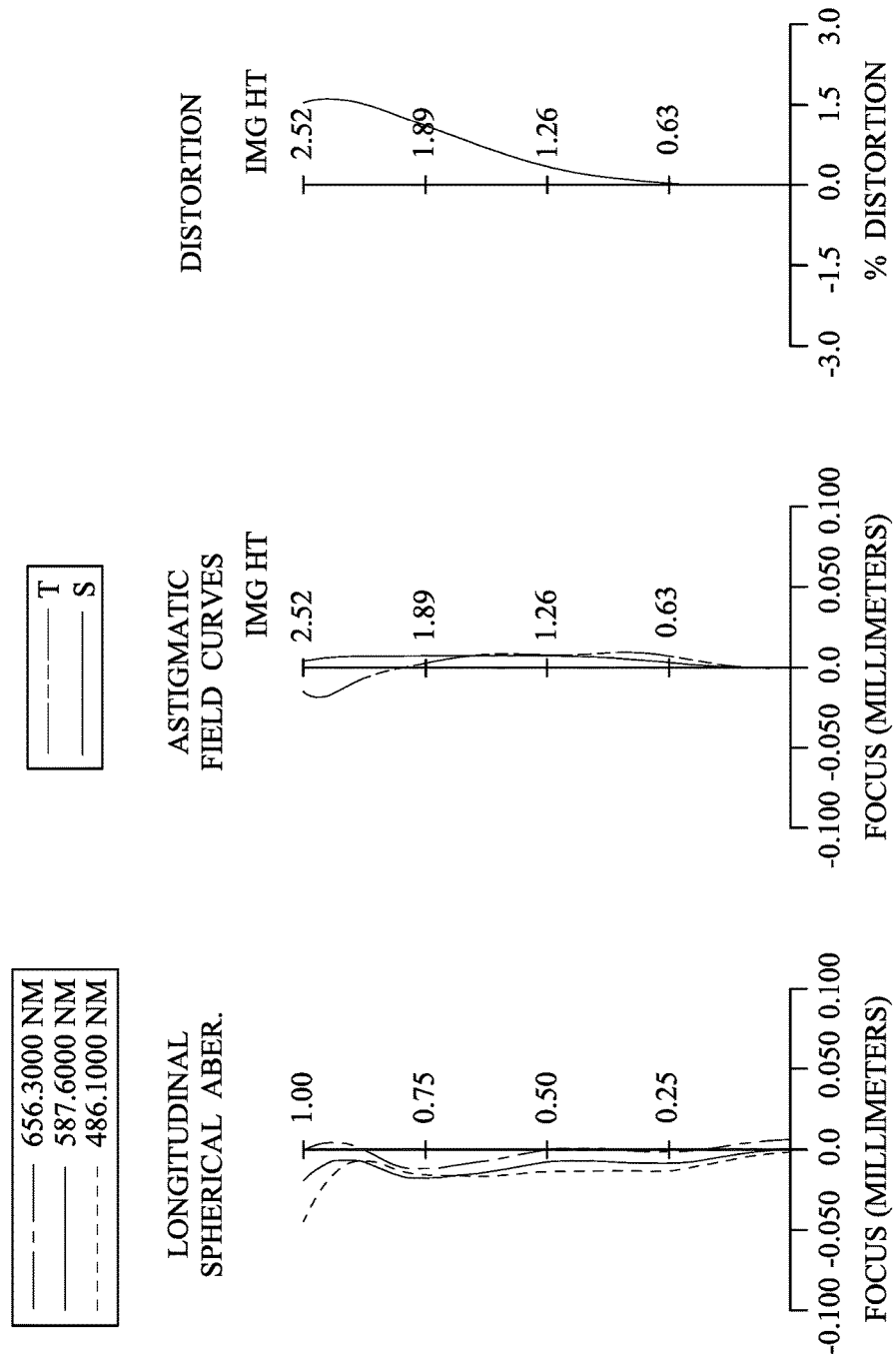
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an optical image system (its reference numeral is omitted) and an image sensor 690. The optical image system includes, in order from an object side to an image side, a stop 601, a first lens element 610, a second lens element 620, an aperture stop 600, a third lens element 630, a fourth lens element 640, a fifth lens element 650, a sixth lens element 660, an IR-cut filter 670 and an image surface 680, wherein the image sensor 690 is disposed on the image surface 680 of the optical image system. The optical image system has a total of six lens elements (610-660), and there is an air space between every two lens elements of the first lens element 610, the second lens element 620, the third lens element 630, the fourth lens element 640, the fifth lens element 650 and the sixth lens element 660 that are adjacent to each other.

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of a plastic material, and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with negative refractive power has an object-side surface 651 being concave in a paraxial region thereof and an image-side surface 652 being concave in a paraxial region thereof. The fifth lens element 650 is made of a plastic material, and has the object-side surface 651 and the image-side surface 652 being both aspheric. Furthermore, the image-side surface 652 of the fifth lens element 650 includes at least one inflection point.

The sixth lens element 660 with negative refractive power has an object-side surface 661 being concave in a paraxial region thereof and an image-side surface 662 being convex in a paraxial region thereof. The sixth lens element 660 is made of a plastic material, and has the object-side surface 661 and the image-side surface 662 being both aspheric. Furthermore, each of the object-side surface 661 and the image-side surface 662 of the sixth lens element 660 includes at least one inflection point.

The IR-cut filter 670 is made of a glass material and located between the sixth lens element 660 and the image surface 680, and will not affect the focal length of the optical image system.

The detailed optical data of the 6th embodiment are shown in Table 11 and the aspheric surface data are shown in Table 12 below.

TABLE 11

6th Embodiment
f = 6.54 mm, Fno = 2.41, HFOV = 20.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Stop | Plano | −0.629 | | | | |
| 2 | Lens 1 | 1.617 ASP | 1.225 | Plastic | 1.544 | 55.9 | 2.65 |
| 3 | | −9.634 ASP | 0.040 | | | | |
| 4 | Lens 2 | 16.482 ASP | 0.230 | Plastic | 1.660 | 20.4 | −6.37 |
| 5 | Ape. Stop | 3.330 ASP | 0.296 | | | | |
| 6 | Lens 3 | −10.149 ASP | 0.230 | Plastic | 1.639 | 23.3 | −5.21 |
| 7 | | 4.996 ASP | 0.408 | | | | |
| 8 | Lens 4 | −53.076 ASP | 0.385 | Plastic | 1.660 | 20.4 | 7.04 |
| 9 | | −4.283 ASP | 0.040 | | | | |
| 10 | Lens 5 | −5.481 ASP | 0.240 | Plastic | 1.544 | 55.9 | −6.55 |
| 11 | | 10.328 ASP | 1.295 | | | | |
| 12 | Lens 6 | −5.186 ASP | 0.727 | Plastic | 1.544 | 55.9 | −18.20 |
| 13 | | −11.435 ASP | 0.300 | | | | |
| 14 | IR-cut filter | Plano | 0.210 | Glass | 1.517 | 64.2 | — |
| 15 | | Plano | 0.311 | | | | |
| 16 | Image | Plano | — | | | | |

Reference wavelength is 587.6 nm (d-line).
Effective radius of Surface 1 is 1.360 mm.

TABLE 12

Aspheric Coefficients

| Surface # | 2 | 3 | 4 | 5 | 6 | 7 |
|---|---|---|---|---|---|---|
| k = | −1.4143E−01 | 4.7747E+01 | −9.0000E+01 | 6.3794E+00 | −9.0000E+01 | −4.4410E+00 |
| A4 = | 8.6448E−06 | 3.0752E−02 | −2.3250E−02 | −1.1041E−01 | −2.1280E−01 | −2.0796E−01 |
| A6 = | 3.6125E−03 | −4.1492E−02 | 8.2028E−02 | 3.8356E−01 | 7.2660E−01 | 7.2163E−01 |
| A8 = | −8.1227E−03 | 4.1760E−02 | −4.0305E−02 | −7.1609E−01 | −8.9918E−01 | −9.6176E−01 |
| A10 = | 5.9389E−03 | −2.2397E−02 | 2.8482E−02 | 1.4956E+00 | 7.1062E−01 | 7.2490E−01 |
| A12 = | −2.5663E−03 | 5.0580E−03 | −1.3852E−02 | −1.6490E+00 | −3.0659E−01 | −2.3745E−01 |
| A14 = | | | 5.0425E−03 | 8.2596E−01 | 8.5038E−02 | |
| A16 = | | | | | −6.7921E−03 | |

| Surface # | 8 | 9 | 10 | 11 | 12 | 13 |
|---|---|---|---|---|---|---|
| k = | 9.0000E+01 | −8.8802E+01 | 2.2544E+01 | −1.3395E+01 | −9.0000E+01 | −3.5331E+01 |
| A4 = | −1.9638E−01 | −4.5226E−01 | −3.4703E−01 | −8.0218E−02 | −9.7259E−02 | −4.8007E−02 |
| A6 = | 1.3690E−01 | 9.1611E−01 | 9.1005E−01 | 1.6768E−01 | 6.7701E−02 | −2.8337E−03 |
| A8 = | −1.5208E−01 | −1.3563E+00 | −1.2642E+00 | −2.1600E−01 | −3.4474E−02 | 1.2350E−02 |
| A10 = | −4.9744E−02 | 7.5505E−01 | 5.8870E−01 | 2.1216E−01 | 1.4110E−01 | −7.3732E−03 |
| A12 = | 1.2212E−01 | 4.1733E−01 | 5.9167E−01 | −1.4676E−01 | −3.6534E−03 | 2.2076E−03 |
| A14 = | | −7.3178E−01 | −8.3419E−01 | 5.6780E−02 | 5.0276E−04 | −3.3314E−04 |
| A16 = | | 2.6928E−01 | 2.8577E−01 | −8.9511E−03 | −2.7796E−05 | 2.0058E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.54 | T56/(T12 + T23 + T34 + T45) | 1.65 |
| f/EPD | 2.41 | | |
| HFOV [deg.] | 20.8 | Y11/Y32 | 1.43 |
| V2 + V3 + V4 | 64.1 | f/ImgH | 2.60 |
| CT1/BL | 1.49 | f1/f3 | −0.51 |
| CT1/Sag11 | 1.87 | f1/f4 | 0.38 |

-continued

| 6th Embodiment | | | |
|---|---|---|---|
| (CT2 + CT3 + CT4 + CT5)/CT1 | 0.89 | f3/f2 | 0.82 |
| | | f5/f6 | 0.36 |

-continued

6th Embodiment

| (T45 + T56)/(T12 + T23 + T34) | 1.79 | Σ\|f/fx\| | 7.04 |
|---|---|---|---|

Furthermore, according to the 6th embodiment, numbers of the inflection points of each object-side surface (651, 661) and each image-side surface (652, 662) of the fifth lens element 650 and the sixth lens element 660 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 651 | 652 | 661 | 662 |
| Number of inflection points | 0 | 1 | 1 | 1 |

7th Embodiment

Figure 13:
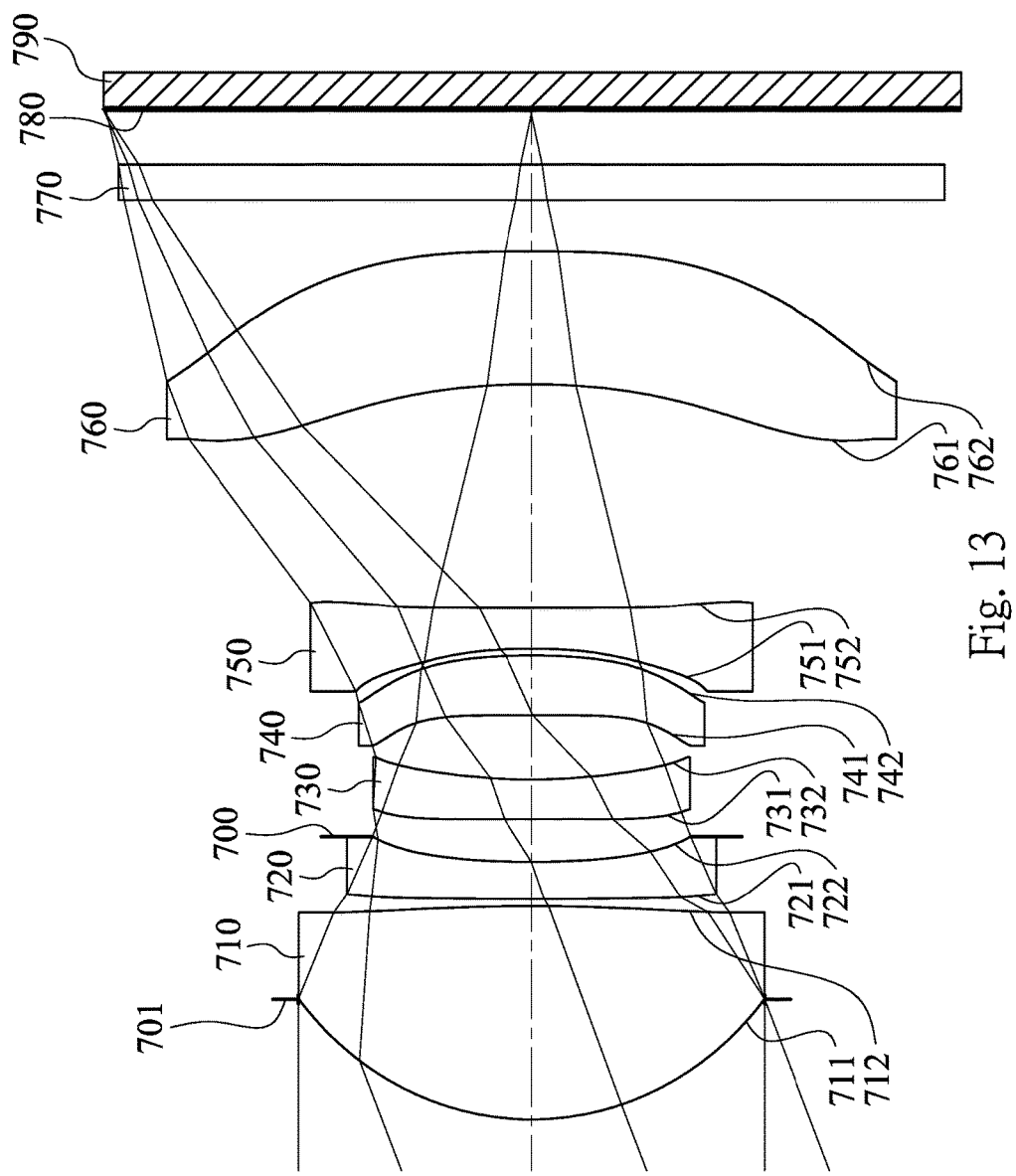
FIG. 13 is a schematic view of an image capturing device according to the 7th embodiment of the present disclosure.
Figure 14:
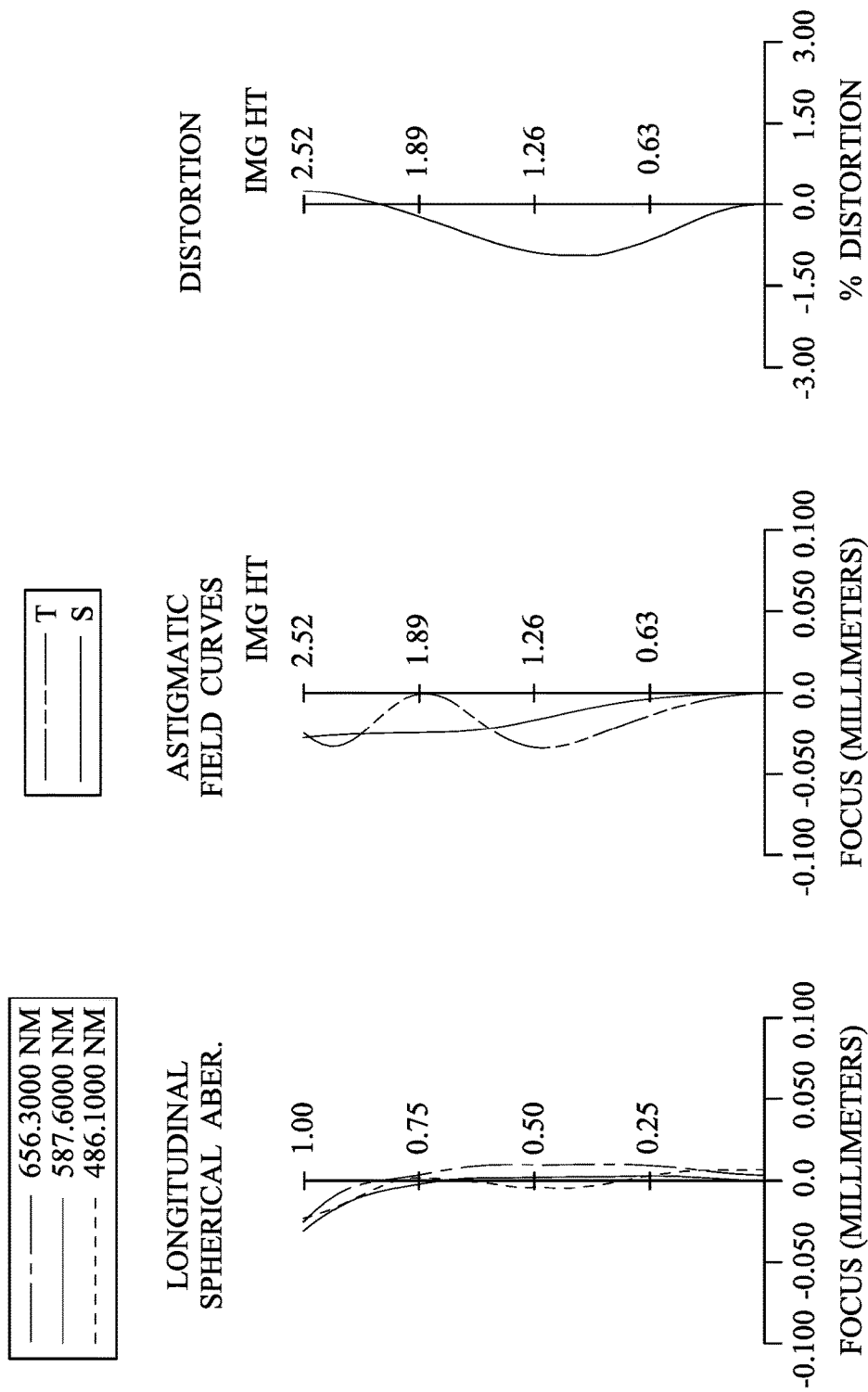
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an optical image system (its reference numeral is omitted) and an image sensor 790. The optical image system includes, in order from an object side to an image side, a stop 701, a first lens element 710, a second lens element 720, an aperture stop 700, a third lens element 730, a fourth lens element 740, a fifth lens element 750, a sixth lens element 760, an IR-cut filter 770 and an image surface 780, wherein the image sensor 790 is disposed on the image surface 780 of the optical image system. The optical image system has a total of six lens elements (710-760), and there is an air space between every two lens elements of the first lens element 710, the second lens element 720, the third lens element 730, the fourth lens element 740, the fifth lens element 750 and the sixth lens element 760 that are adjacent to each other.

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of a plastic material, and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of a plastic material, and has the object-side surface 751 and the image-side surface 752 being both aspheric. Furthermore, the image-side surface 752 of the fifth lens element 750 includes at least one inflection point.

The sixth lens element 760 with negative refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point.

The IR-cut filter 770 is made of a glass material and located between the sixth lens element 760 and the image surface 780, and will not affect the focal length of the optical image system.

The detailed optical data of the 7th embodiment are shown in Table 13 and the aspheric surface data are shown in Table 14 below.

TABLE 13

7th Embodiment
f = 6.59 mm, Fno = 2.41, HFOV = 20.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.705 | | | | |
| 2 | Lens 1 | 1.640 | ASP | 1.254 | Plastic | 1.544 | 55.9 | 2.69 |
| 3 | | −10.021 | ASP | 0.042 | | | | |
| 4 | Lens 2 | −118.838 | ASP | 0.220 | Plastic | 1.660 | 20.4 | −8.31 |
| 5 | Ape. Stop | 5.751 | ASP | 0.252 | | | | |
| 6 | Lens 3 | −44.268 | ASP | 0.232 | Plastic | 1.660 | 20.4 | −4.79 |
| 7 | | 3.414 | ASP | 0.379 | | | | |
| 8 | Lens 4 | −101.065 | ASP | 0.350 | Plastic | 1.660 | 20.4 | 8.65 |
| 9 | | −5.410 | ASP | 0.040 | | | | |
| 10 | Lens 5 | −4.994 | ASP | 0.240 | Plastic | 1.544 | 55.9 | −7.58 |
| 11 | | 24.026 | ASP | 1.316 | | | | |
| 12 | Lens 6 | −4.833 | ASP | 0.786 | Plastic | 1.535 | 55.8 | −12.96 |

TABLE 13-continued

7th Embodiment
f = 6.59 mm, Fno = 2.41, HFOV = 20.9 deg.

| Surface # | | Curvature Radius | | Thickness | Material | Index | Abbe # | Focal Length |
|---|---|---|---|---|---|---|---|---|
| 13 | | −16.876 | ASP | 0.300 | | | | |
| 14 | IR-cut filter | Plano | | 0.210 | Glass | 1.517 | 64.2 | — |
| 15 | | Plano | | 0.325 | | | | |
| 16 | Image | Plano | | — | | | | |

Reference wavelength is 587.6 nm (d-line).
Effective radius of Surface 1 is 1.370 mm.
Effective radius of Surface 11 is 1.300 mm.

TABLE 14

Aspheric Coefficients

| Surface # | 2 | 3 | 4 | 5 | 6 | 7 |
|---|---|---|---|---|---|---|
| k = | −9.3055E−02 | 4.7712E+01 | −9.0000E+01 | 1.3366E+01 | 4.8848E+01 | −6.3883E+00 |
| A4 = | 9.1682E−07 | 9.5933E−02 | 1.3432E−01 | 1.3019E−01 | 6.0460E−02 | 2.1642E−03 |
| A6 = | −9.1998E−04 | −2.5379E−01 | −3.8822E−01 | −2.9426E−01 | −1.0782E−01 | −1.7372E−01 |
| A8 = | 2.5092E−03 | 3.3532E−01 | 4.3243E−01 | 3.3373E−01 | 6.8236E−01 | 5.5781E−01 |
| A10 = | −1.9273E−03 | −1.9939E−01 | −8.1553E−02 | 4.5740E−02 | 8.4542E−01 | −6.5588E−01 |
| A12 = | 3.9600E−04 | 4.5634E−02 | −1.3530E−01 | −1.1224E−01 | −1.8546E+00 | 3.3399E−01 |
| A14 = | | | 6.2224E−02 | −1.7440E−02 | 1.7123E+00 | |
| A16 = | | | | | −6.3315E−01 | |

| Surface # | 8 | 9 | 10 | 11 | 12 | 13 |
|---|---|---|---|---|---|---|
| k = | 9.0000E+01 | −8.9284E+01 | 2.1379E+01 | −1.7874E+01 | −5.2001E+01 | −3.5331E+01 |
| A4 = | −1.0075E−01 | −5.6789E−01 | −7.1617E−01 | −1.6950E−01 | −1.2888E−01 | −1.1683E−01 |
| A6 = | −3.4301E−01 | 1.5955E+00 | 2.6260E+00 | 6.4236E−01 | 1.1479E−01 | 7.3280E−02 |
| A8 = | 6.4452E−01 | −3.4079E+00 | −5.0644E+00 | −1.1184E+00 | −6.9360E−02 | −3.7920E−02 |
| A10 = | −1.2472E+00 | 3.5509E+00 | 5.0178E+00 | 1.1935E+00 | 2.8484E−01 | 1.3507E−02 |
| A12 = | 8.7703E−01 | −1.1759E+00 | −1.5180E+00 | −7.7433E−01 | −6.9449E−03 | −3.1744E−03 |
| A14 = | | −6.7293E−01 | −1.0454E+00 | 2.7273E−01 | 9.0742E−04 | 4.4109E−04 |
| A16 = | | 4.6973E−01 | 6.3360E−01 | −3.9800E−02 | −4.9413E−05 | −2.6422E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.59 | T56/(T12 + T23 + T34 + T45) | 1.85 |
| f/EPD | 2.41 | | |
| HFOV [deg.] | 20.9 | Y11/Y32 | 1.50 |
| V2 + V3 + V4 | 61.2 | f/ImgH | 2.62 |
| CT1/BL | 1.50 | f1/f3 | −0.56 |
| CT1/Sag11 | 1.77 | f1/f4 | 0.31 |
| (CT2 + CT3 + CT4 + CT5)/CT1 | 0.83 | f3/f2 | 0.58 |
| | | f5/f6 | 0.58 |
| (T45 + T56)/(T12 + T23 + T34) | 2.01 | Σ|f/fx| | 6.76 |

Furthermore, according to the 7th embodiment, numbers of the inflection points of each object-side surface (751, 761) and each image-side surface (752, 762) of the fifth lens element 750 and the sixth lens element 760 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 751 | 752 | 761 | 762 |
| Number of inflection points | 0 | 3 | 2 | 2 |

8th Embodiment

Figure 15:
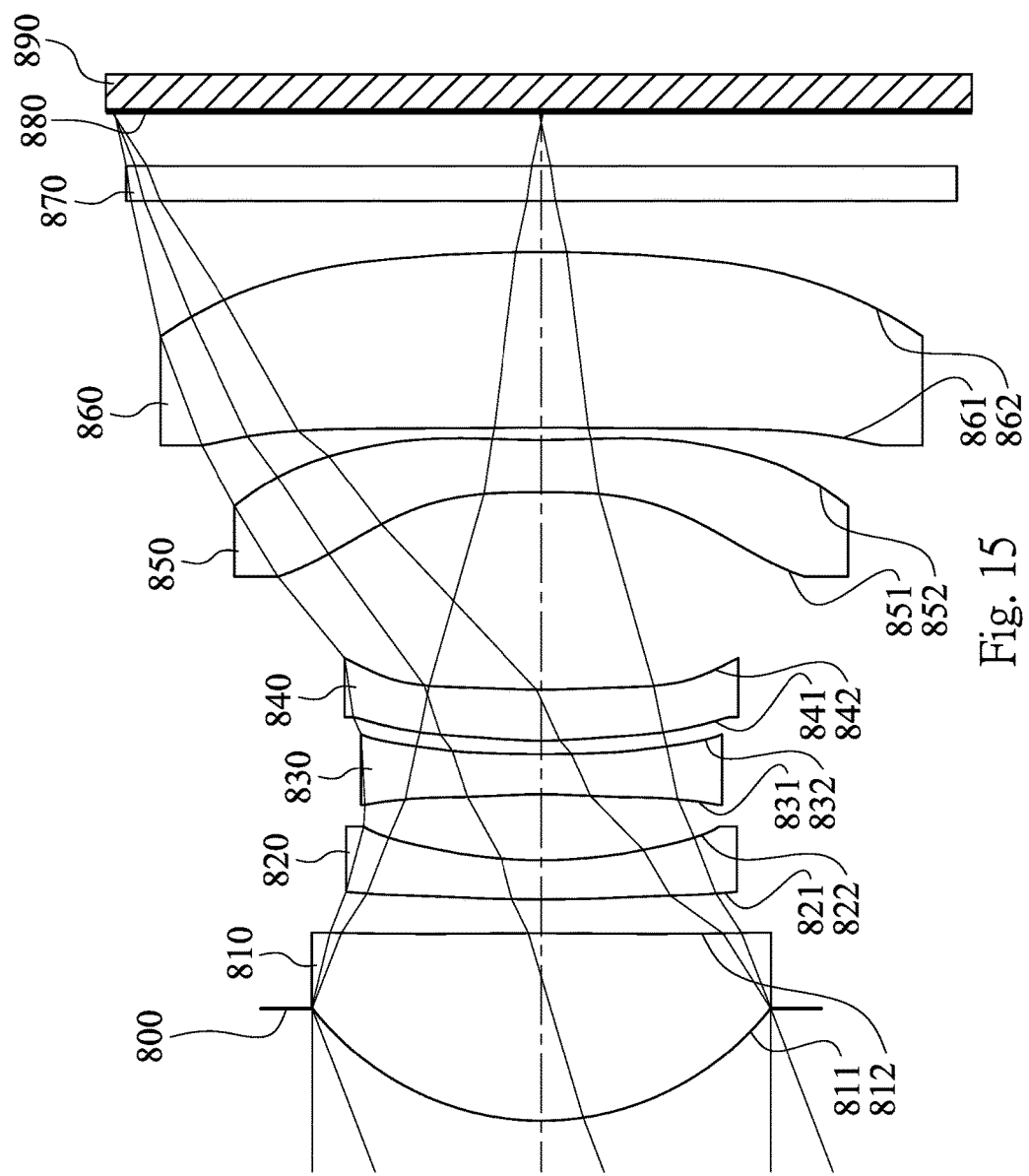
FIG. 15 is a schematic view of an image capturing device according to the 8th embodiment of the present disclosure.
Figure 16:
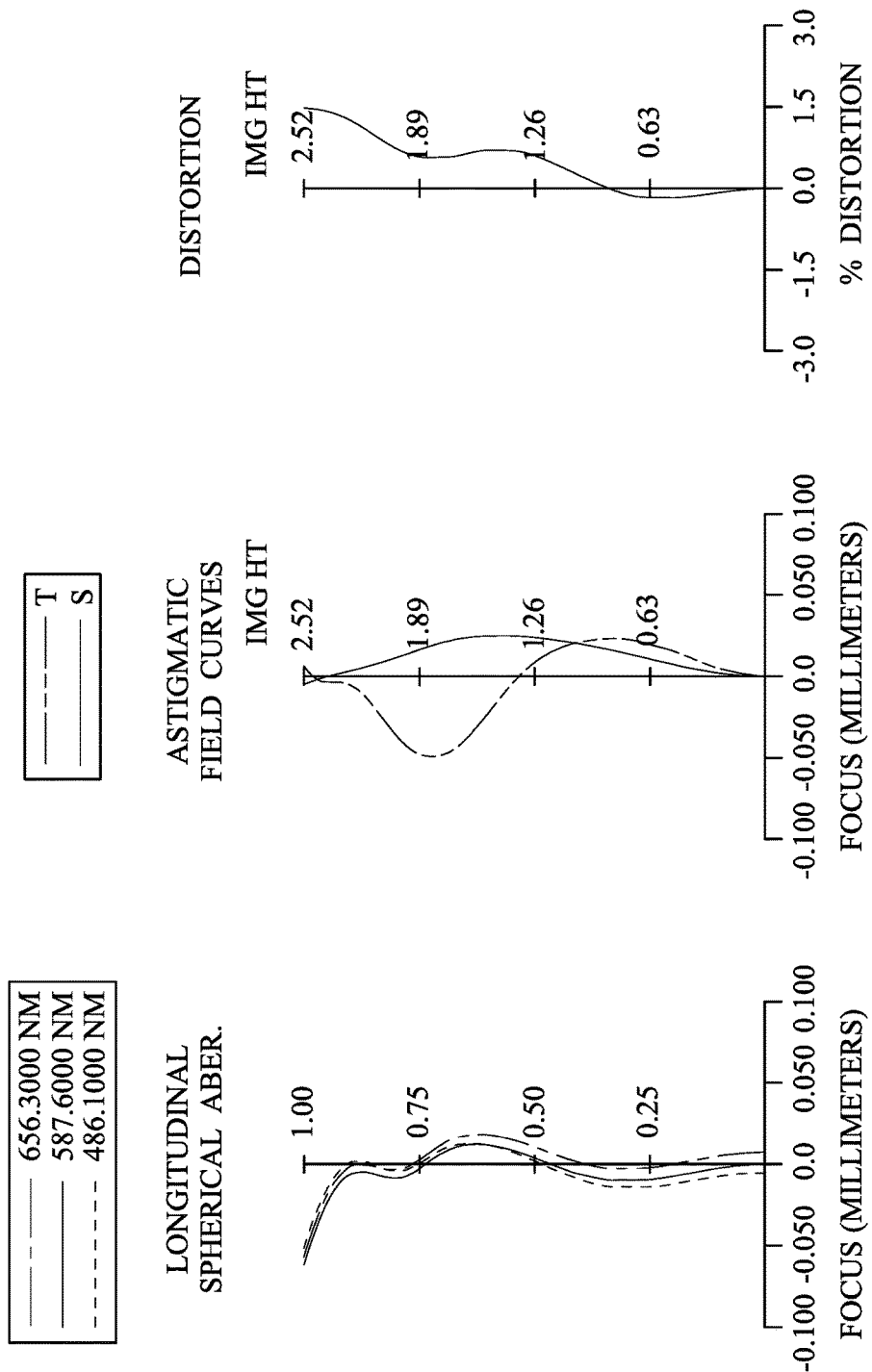
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes an optical image system (its reference numeral is omitted) and an image sensor 890. The optical image system includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880, wherein the image sensor 890 is disposed on the image surface 880 of the optical image system. The optical image system has a total of six lens elements (810-860), and there is an air space between every two lens elements of the first lens element 810, the second lens element 820, the third lens element 830, the fourth lens element 840, the fifth lens element 850 and the sixth lens element 860 that are adjacent to each other.

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with positive refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with negative refractive power has an object-side surface 851 being concave in a paraxial region thereof and an image-side surface 852 being concave in a paraxial region thereof. The fifth lens element 850 is made of a plastic material, and has the object-side surface 851 and the image-side surface 852 being both aspheric. Furthermore, each of the object-side surface 851 and the image-side surface 852 of the fifth lens element 850 includes at least one inflection point.

The sixth lens element 860 with positive refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric. Furthermore, each of the object-side surface 861 and the image-side surface 862 of the sixth lens element 860 includes at least one inflection point.

The IR-cut filter 870 is made of a glass material and located between the sixth lens element 860 and the image surface 880, and will not affect the focal length of the optical image system.

The detailed optical data of the 8th embodiment are shown in Table 15 and the aspheric surface data are shown in Table 16 below.

TABLE 15

8th Embodiment
f = 6.47 mm, Fno = 2.40, HFOV = 21.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.662 | | | | |
| 2 | Lens 1 | 1.686 ASP | 1.105 | Plastic | 1.544 | 56.0 | 2.96 |
| 3 | | −28.254 ASP | 0.199 | | | | |
| 4 | Lens 2 | 9.989 ASP | 0.230 | Plastic | 1.660 | 20.4 | −6.65 |
| 5 | | 3.022 ASP | 0.387 | | | | |
| 6 | Lens 3 | −3.856 ASP | 0.240 | Plastic | 1.639 | 23.5 | −4.24 |
| 7 | | 9.338 ASP | 0.079 | | | | |
| 8 | Lens 4 | 2.484 ASP | 0.300 | Plastic | 1.639 | 23.5 | 6.95 |
| 9 | | 5.376 ASP | 1.160 | | | | |
| 10 | Lens 5 | −9.013 ASP | 0.310 | Plastic | 1.544 | 56.0 | −6.23 |
| 11 | | 5.511 ASP | 0.073 | | | | |
| 12 | Lens 6 | −19.843 ASP | 1.031 | Plastic | 1.660 | 20.4 | 39.48 |
| 13 | | −11.497 ASP | 0.300 | | | | |
| 14 | IR-cut filter | Plano | 0.210 | Glass | 1.517 | 64.2 | — |
| 15 | | Plano | 0.320 | | | | |
| 16 | Image | Plano | — | | | | |

Reference wavelength is 587.6 nm (d-line).

TABLE 16

Aspheric Coefficients

| Surface # | 2 | 3 | 4 | 5 | 6 | 7 |
|---|---|---|---|---|---|---|
| k = | −2.9071E−01 | 6.1140E+01 | 3.0962E+01 | −2.2707E+00 | −1.9165E+00 | 2.7293E+01 |
| A4 = | 7.4082E−03 | 3.2309E−02 | 6.6831E−03 | 4.2087E−02 | 3.3887E−01 | −1.2946E−01 |
| A6 = | 7.7039E−04 | −3.1718E−02 | −1.0527E−01 | −7.6584E−02 | −3.0830E−01 | 1.2408E+00 |
| A8 = | 1.5402E−03 | 2.2129E−02 | 1.0563E−01 | −2.8711E−02 | −1.8248E−01 | −2.9588E+00 |
| A10 = | | −6.1858E−03 | −2.9926E−02 | 9.8376E−02 | 1.8875E−01 | 3.1339E+00 |
| A12 = | | | | −2.3397E−02 | 1.7795E−01 | −1.5457E+00 |
| A14 = | | | | | −1.4176E−01 | 2.9461E−01 |

| Surface # | 8 | 9 | 10 | 11 | 12 | 13 |
|---|---|---|---|---|---|---|
| k = | 2.8904E+00 | −2.8816E+00 | 1.0539E+01 | 2.0864E+00 | −4.1499E+01 | −4.0554E+01 |
| A4 = | −6.5627E−01 | −2.1981E−01 | −3.4059E−01 | −2.2843E−01 | 5.6855E−02 | −3.8733E−02 |

TABLE 16-continued

Aspheric Coefficients

| A6 = | 1.4419E+00 | 2.6044E−01 | 2.7825E−01 | 1.3475E−01 | −6.7791E−02 | 5.9812E−02 |
|---|---|---|---|---|---|---|
| A8 = | −1.7538E+00 | 1.4883E−01 | −1.4147E−01 | −3.8761E−02 | 4.0292E−02 | −4.9474E−02 |
| A10 = | 1.1958E+00 | −2.4547E−01 | 5.1473E−02 | 1.6667E−03 | −1.2988E−02 | 2.0022E−02 |
| A12 = | −4.1578E−01 | 7.6105E−02 | −1.0764E−02 | 1.2481E−03 | 2.0342E−03 | −4.2940E−03 |
| A14 = | 4.7058E−02 | −3.6991E−03 | 9.1123E−04 | −2.0258E−04 | −1.1073E−04 | 4.6858E−04 |
| A16 = | | | | 7.8882E−06 | −1.7932E−06 | −2.0458E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.47 | T56/(T12 + T23 + T34 + T45) | 0.04 |
| f/EPD | 2.40 | | |
| HFOV [deg.] | 21.0 | Y11/Y32 | 1.27 |
| V2 + V3 + V4 | 67.4 | f/ImgH | 2.57 |
| CT1/BL | 1.33 | f1/f3 | −0.70 |
| CT1/Sag11 | 1.65 | f1/f4 | 0.43 |
| (CT2 + CT3 + CT4 + CT5)/CT1 | 0.98 | f3/f2 | 0.64 |
| | | f5/f6 | −0.16 |
| (T45 + T56)/ (T12 + T23 + T34) | 1.85 | Σ|f/fx| | 6.82 |

Furthermore, according to the 8th embodiment, numbers of the inflection points of each object-side surface (851, 861) and each image-side surface (852, 862) of the fifth lens element 850 and the sixth lens element 860 are listed in the following table, wherein the number of the inflection points means the number of the inflection points located between a position of the surface on the optical axial and a maximum effective radius position on the surface.

| Lens element | Fifth lens element | | Sixth lens element | |
|---|---|---|---|---|
| Surface | 851 | 852 | 861 | 862 |
| Number of inflection points | 1 | 1 | 3 | 1 |

9th Embodiment

Figure 17:
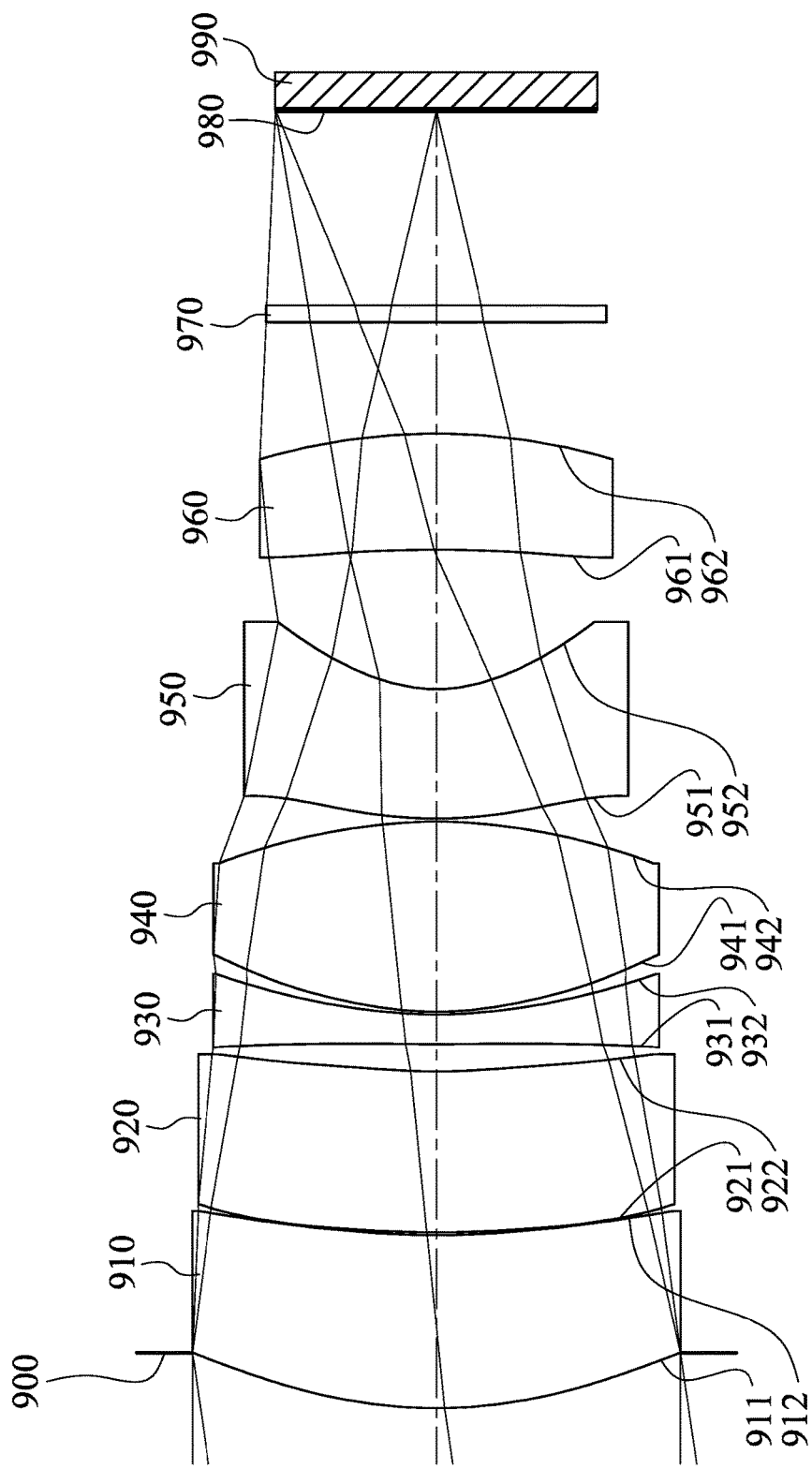
FIG. 17 is a schematic view of an image capturing device according to the 9th embodiment of the present disclosure.
Figure 18:
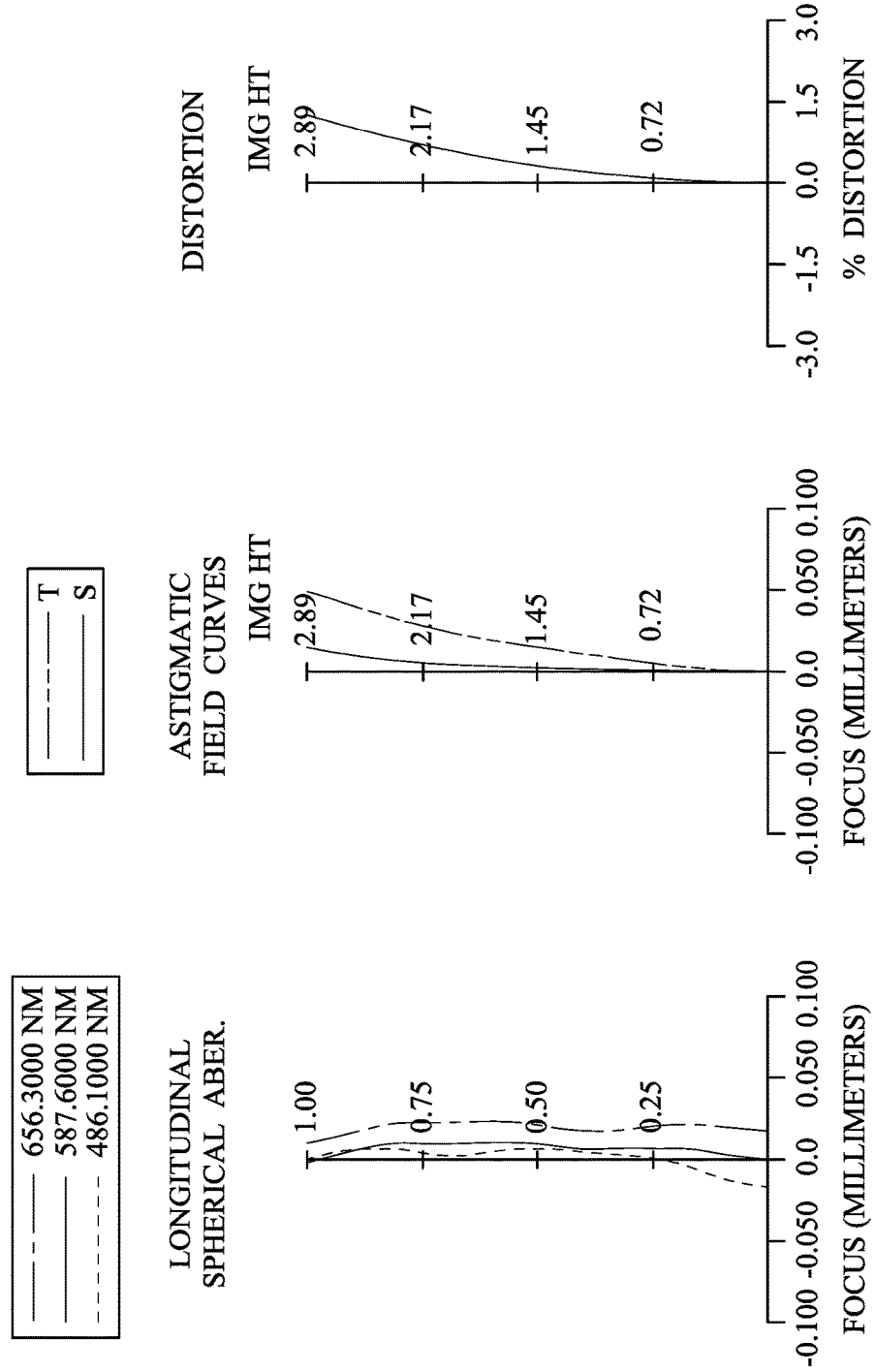
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows spherical aberration curves, astigmatic field curves and a distortion curve of the image capturing device according to the 9th embodiment. In FIG. 17, the image capturing device includes an optical image system (its reference numeral is omitted) and an image sensor 990. The optical image system includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image surface 980, wherein the image sensor 990 is disposed on the image surface 980 of the optical image system. The optical image system has a total of six lens elements (910-960), and there is an air space between every two lens elements of the first lens element 910, the second lens element 920, the third lens element 930, the fourth lens element 940, the fifth lens element 950 and the sixth lens element 960 that are adjacent to each other.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of a plastic material, and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of a plastic material, and has the object-side surface 951 and the image-side surface 952 being both aspheric. Furthermore, the object-side surface 951 of the fifth lens element 950 includes at least one inflection point.

The sixth lens element 960 with positive refractive power has an object-side surface 961 being concave in a paraxial region thereof and an image-side surface 962 being convex in a paraxial region thereof. The sixth lens element 960 is made of a plastic material, and has the object-side surface 961 and the image-side surface 962 being both aspheric. Furthermore, the object-side surface 961 of the sixth lens element 960 includes at least one inflection point.

The IR-cut filter 970 is made of a glass material and located between the sixth lens element 960 and the image surface 980, and will not affect the focal length of the optical image system.

The detailed optical data of the 9th embodiment are shown in Table 17 and the aspheric surface data are shown in Table 18 below.

TABLE 17

9th Embodiment
f = 19.49 mm, Fno = 2.22, HFOV = 8.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.991 | | | | |
| 2 | Lens 1 | 8.826 ASP | 3.116 | Plastic | 1.544 | 55.9 | 39.61 |
| 3 | | 13.095 ASP | 0.050 | | | | |
| 4 | Lens 2 | 15.734 ASP | 2.892 | Plastic | 1.555 | 44.3 | −85.13 |
| 5 | | 11.031 ASP | 0.495 | | | | |
| 6 | Lens 3 | 28.496 ASP | 0.537 | Plastic | 1.602 | 28.8 | −21.56 |
| 7 | | 8.857 ASP | 0.050 | | | | |
| 8 | Lens 4 | 6.496 ASP | 3.420 | Plastic | 1.544 | 56.0 | 7.14 |
| 9 | | −7.844 ASP | 0.050 | | | | |
| 10 | Lens 5 | 8.566 ASP | 2.336 | Plastic | 1.603 | 28.6 | −8.90 |
| 11 | | 2.961 ASP | 2.505 | | | | |
| 12 | Lens 6 | −22.756 ASP | 2.093 | Plastic | 1.660 | 20.4 | 33.83 |
| 13 | | −11.682 ASP | 2.000 | | | | |
| 14 | IR-cut filter | Plano | 0.300 | Glass | 1.517 | 64.2 | |
| 15 | | Plano | 3.525 | | | | |
| 16 | Image | Plano | — | | | | |

Reference wavelength is 587.6 nm (d-line).

TABLE 18

Aspheric Coefficients

| Surface # | 2 | 3 | 4 | 5 | 6 | 7 |
|---|---|---|---|---|---|---|
| k = | −1.0814E+00 | −3.1456E−01 | 6.1668E+00 | −1.7237E+00 | 1.5429E+01 | −6.7844E+00 |
| A4 = | −1.5412E−04 | −4.9747E−03 | −5.0591E−03 | −6.7407E−03 | −6.5057E−03 | −3.9882E−04 |
| A6 = | 1.0601E−05 | 9.0216E−04 | 9.0932E−04 | 8.4307E−04 | 1.0391E−03 | −8.5298E−05 |
| A8 = | −1.4361E−06 | −8.4216E−05 | −8.1666E−05 | −6.3731E−05 | −9.9668E−05 | 2.1045E−05 |
| A10 = | 3.8446E−08 | 3.7589E−06 | 3.6475E−06 | 3.0349E−06 | 5.1567E−06 | −1.1416E−06 |
| A12 = | −2.6327E−10 | −6.4124E−08 | −6.3556E−08 | −6.7557E−08 | −1.0942E−07 | 1.6615E−08 |

| Surface # | 8 | 9 | 10 | 11 | 12 | 13 |
|---|---|---|---|---|---|---|
| k = | −8.8806E+00 | −3.6285E+00 | −1.2388E+01 | −2.6144E+00 | 1.0847E+01 | 7.9257E+00 |
| A4 = | 2.0527E−03 | 4.3819E−03 | 4.6865E−03 | 4.8123E−03 | 1.9685E−04 | 2.9031E−04 |
| A6 = | −5.4329E−04 | −8.2204E−04 | −9.8580E−04 | −5.0252E−04 | 7.9280E−05 | 2.8780E−05 |
| A8 = | 7.5276E−05 | 7.5844E−05 | 6.4957E−05 | −3.0940E−05 | −1.9477E−05 | −9.5636E−07 |
| A10 = | −4.0665E−06 | −3.5437E−06 | −1.8540E−06 | 1.3058E−05 | 3.6749E−06 | 4.1903E−07 |
| A12 = | 7.3555E−08 | 6.4495E−08 | 8.1643E−09 | −7.9535E−07 | −1.8109E−07 | −1.0113E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 19.49 | T56/(T12 + T23 + T34 + T45) | 3.88 |
| f/EPD | 2.22 | | |
| HFOV [deg.] | 8.3 | Y11/Y32 | 1.11 |
| V2 + V3 + V4 | 129.1 | f/ImgH | 6.74 |
| CT1/BL | 0.53 | f1/f3 | −1.84 |
| CT1/Sag11 | 3.13 | f1/f4 | 5.55 |
| (CT2 + CT3 + CT4 + CT5)/CT1 | 2.95 | f3/f2 | 0.25 |
| | | f5/f6 | −0.26 |
| (T45 + T56)/(T12 + T23 + T34) | 4.29 | Σ|f/fx| | 7.12 |

Furthermore, according to the 9th embodiment, numbers of the inflection points of each object-side surface (951, 961) and each image-side surface (952, 962) of the fifth lens element 950 and the sixth lens element 960 are listed in the following table, wherein the number of the inflection points means the number of the inflection points located between a position of the surface on the optical axial and a maximum effective radius position on the surface.

| Lens element | the fifth lens element | | the sixth lens element | |
|---|---|---|---|---|
| Surface | 951 | 952 | 961 | 962 |
| Number of inflection points | 1 | 0 | 1 | 0 |

10th Embodiment

Figure 20:
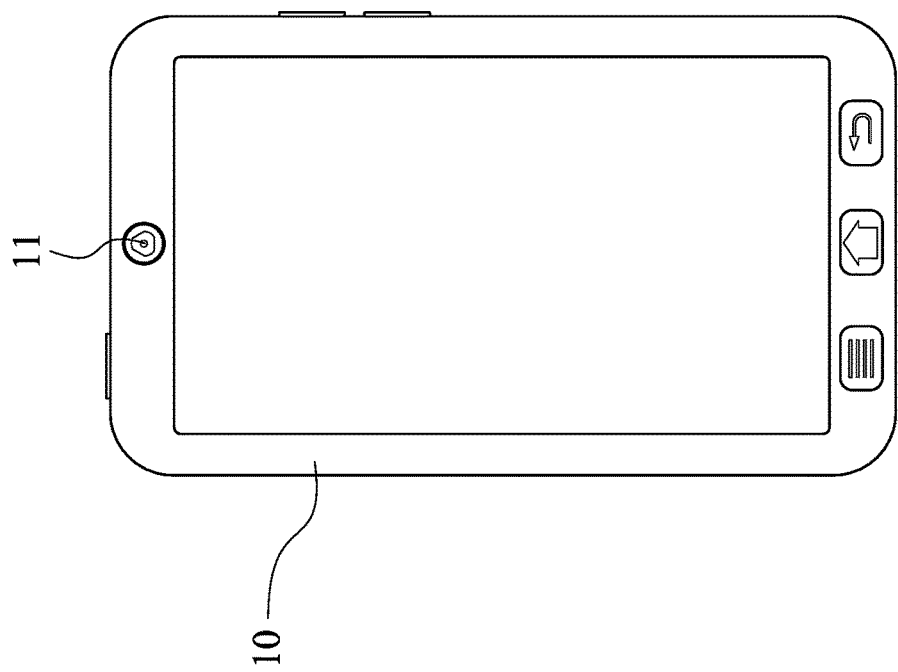
FIG. 20 is a schematic view of an electronic device according to the 10th embodiment of the present disclosure.

FIG. 20 is a schematic view of an electronic device 10 according to the 10th embodiment of the present disclosure. The electronic device 10 of the 10th embodiment is a smartphone, wherein the electronic device 10 includes an image capturing device 11. The image capturing device 11 includes an optical image system (its reference numeral is omitted) according to the present disclosure and an image sensor (its reference numeral is omitted), wherein the image sensor is disposed on an image surface of the optical image system.

11th Embodiment

Figure 21:
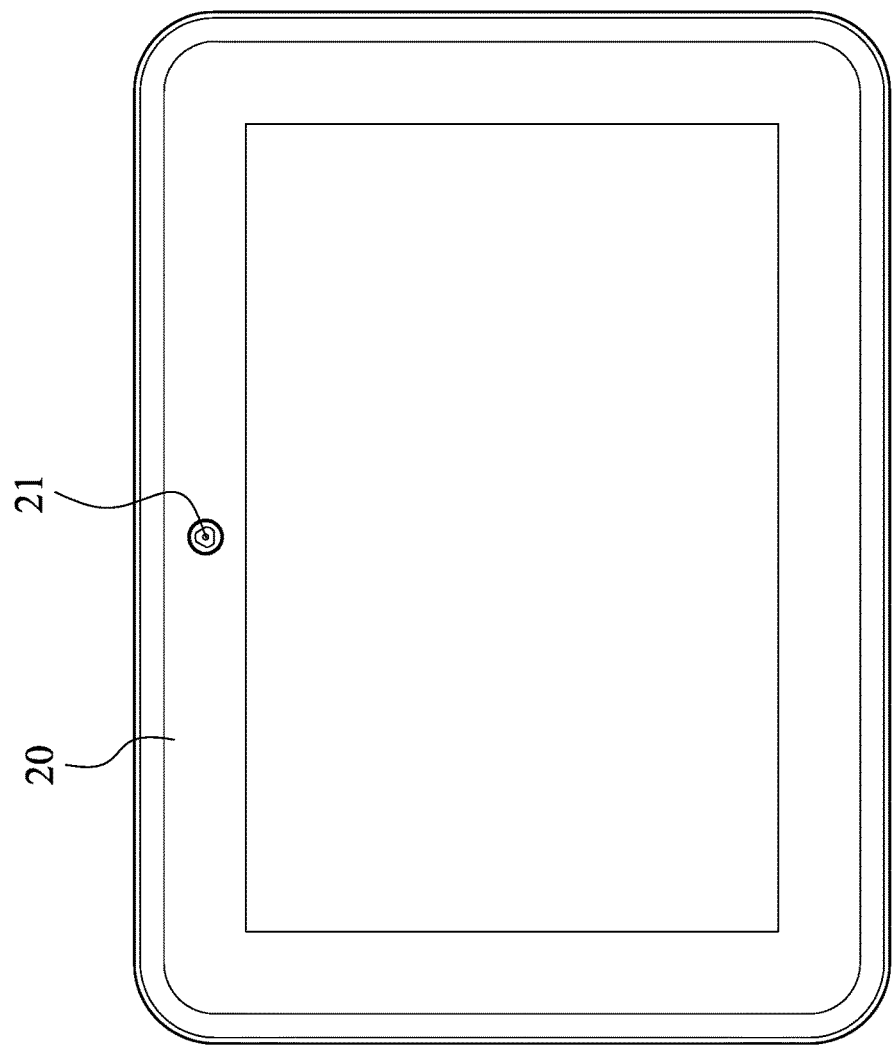
FIG. 21 is a schematic view of an electronic device according to the 11th embodiment of the present disclosure.

FIG. 21 is a schematic view of an electronic device 20 according to the 11th embodiment of the present disclosure. The electronic device 20 of the 11th embodiment is a tablet personal computer, wherein the electronic device 20 includes an image capturing device 21. The image capturing device 21 includes an optical image system (its reference numeral is omitted) according to the present disclosure and an image sensor (its reference numeral is omitted), wherein the image sensor is disposed on an image surface of the optical image system.

12th Embodiment

Figure 22:
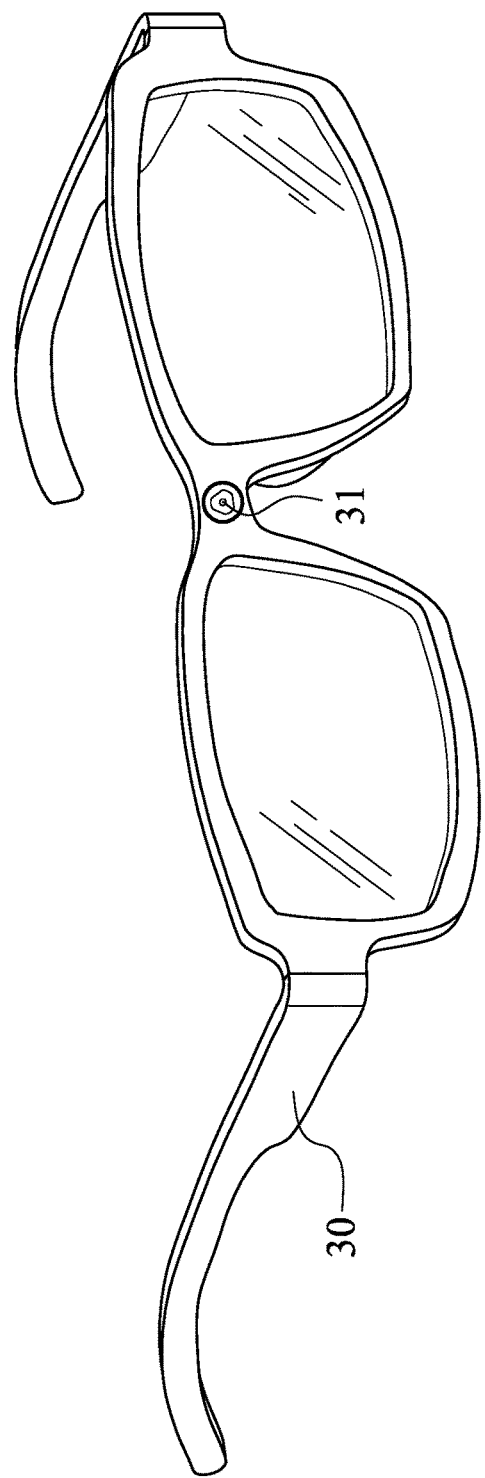
FIG. 22 is a schematic view of an electronic device according to the 12th embodiment of the present disclosure.

FIG. 22 is a schematic view of an electronic device 30 according to the 12th embodiment of the present disclosure. The electronic device 30 of the 12th embodiment is a wearable device, wherein the electronic device 30 includes an image capturing device 31. The image capturing device 31 includes an optical image system (its reference numeral is omitted) according to the present disclosure and an image sensor (its reference numeral is omitted), wherein the image sensor is disposed on an image surface of the optical image system.

The foregoing description, for purpose of explanation, has been described with reference to specific embodiments. It is to be noted that Tables 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image system comprising, in order from an object side to an image side:
a first lens element with positive refractive power having an object-side surface being convex in a paraxial region thereof;
a second lens element having an image-side surface being concave in a paraxial region thereof;
a third lens element having negative refractive power;
a fourth lens element;
a fifth lens element with negative refractive power having an object-side surface and an image-side surface being both aspheric; and
a sixth lens element having an object-side surface and an image-side surface being both aspheric;
wherein the optical image system has a total of six lens elements, there is an air space between every two lens elements of the first lens element, the second lens element, the third lens element, the fourth lens element, the fifth lens element and the sixth lens element that are adjacent to each other, at least one surface of at least one of the fifth lens element and the sixth lens element comprises at least one inflection point, a focal length of the first lens element is f1, a focal length of the second lens element is f2, a focal length of the third lens element is f3, a focal length of the fifth lens element is f5, a focal length of the sixth lens element is f6, an Abbe number of the second lens element is V2, an Abbe number of the third lens element is V3, an Abbe number of the fourth lens element is V4, and the following conditions are satisfied:

$-0.60 < f3/f2 < 1.10;$ $-1.15 < f1/f3 < 0;$ $-2.0 < f5/f6 < 1.5;$ and $30 < V2+V3+V4 < 90.$ 2. The optical image system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following condition is satisfied:

$1.50 < (T45+T56)/(T12+T23+T34) < 5.0.$

3. The optical image system of claim 1, wherein a central thickness of the first lens element is CT1, a central thickness of the second lens element is CT2, a central thickness of the third lens element is CT3, a central thickness of the fourth lens element is CT4, a central thickness of the fifth lens element is CT5, and the following condition is satisfied:

$0.40 < (CT2+CT3+CT4+CT5)/CT1 < 1.65.$

4. The optical image system of claim 1, wherein the fifth lens element has the object-side surface being concave in a paraxial region thereof and the image-side surface being concave in a paraxial region thereof, and the sixth lens element has the object-side surface being concave in a paraxial region thereof.

5. The optical image system of claim 1, wherein the focal length of the second lens element is f2, the focal length of the third lens element is f3, and the following condition is satisfied:

$0 < f3/f2 < 1.0.$

6. The optical image system of claim 1, wherein an Abbe number of the second lens element is V2, an Abbe number of the third lens element is V3, an Abbe number of the fourth lens element is V4, and the following condition is satisfied:

$30 < V2+V3+V4 < 90.$

7. The optical image system of claim 1, wherein a maximum optical effective radius of the object-side surface of the first lens element is Y11, a maximum optical effective radius of an image-side surface of the third lens element is Y32, and the following condition is satisfied:

$1.05 < Y11/Y32 < 2.0.$

8. The optical image system of claim 1, wherein a focal length of the optical image system is f, the focal length of the first lens element is f1, the focal length of the second lens element is f2, the focal length of the third lens element is f3, a focal length of the fourth lens element is f4, the focal length of the fifth lens element is f5, the focal length of the sixth lens element is f6, and the following condition is satisfied:

$4.5 < \Sigma|f/fx| < 9.0$, wherein $x=1,2,3,4,5,6$.

9. The optical image system of claim 1, wherein a focal length of the optical image system is f, a maximum image height of the optical image system is ImgH, and the following condition is satisfied:

$2.0 < f/ImgH < 7.5$.

10. The optical image system of claim 1, wherein the third lens element has an object-side surface being concave in a paraxial region thereof.

11. The optical image system of claim 1, wherein a central thickness of the first lens element is CT1, an axial distance between the image-side surface of the sixth lens element and an image surface is BL, and the following condition is satisfied:

$0.90 < CT1/BL < 2.5$.

12. The optical image system of claim 1, wherein the focal length of the first lens element is f1, a focal length of the fourth lens element is f4, and the following condition is satisfied:

$0.10 < f1/f4 < 1.0$.

13. The optical image system of claim 1, wherein a central thickness of the first lens element is CT1, a distance in parallel with an optical axis from an axial vertex on the object-side surface of the first lens element to a maximum effective radius position on the object-side surface of the first lens element is Sag11, and the following condition is satisfied:

$1.2 < CT1/Sag11 < 2.0$.

14. The optical image system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following condition is satisfied:

$1.0 < T56/(T12+T23+T34+T45) < 5.0$.

15. The optical image system of claim 1, wherein the focal length of the fifth lens element is f5, the focal length of the sixth lens element is f6, and the following condition is satisfied:

$0 < f5/f6 < 1.5$.

16. An image capturing device, comprising:
the optical image system of claim 1; and
an image sensor, wherein the image sensor is disposed on an image surface of the optical image system.

17. An electronic device, comprising:
the image capturing device of claim 16.

18. An optical image system comprising, in order from an object side to an image side:
a first lens element with positive refractive power having an object-side surface being convex in a paraxial region thereof;
a second lens element having negative refractive power;
a third lens element having negative refractive power;
a fourth lens element;
a fifth lens element with negative refractive power having an object-side surface and an image-side surface being both aspheric; and
a sixth lens element having an object-side surface being concave in a paraxial region thereof, and the object-side surface and an image-side surface of the sixth lens element being both aspheric;
wherein the optical image system has a total of six lens elements, there is an air space between every two lens elements of the first lens element, the second lens element, the third lens element, the fourth lens element, the fifth lens element and the sixth lens element that are adjacent to each other, at least one surface of at least one of the fifth lens element and the sixth lens element comprises at least one inflection point, a focal length of the first lens element is f1, a focal length of the second lens element is f2, a focal length of the third lens element is f3, a focal length of the fifth lens element is f5, a focal length of the sixth lens element is f6, and the following conditions are satisfied:

$0 < f3/f2 < 1.10$;

$-2.50 < f1/f3 < 0$; and $-2.0 < f5/f6 < 1.0$.

19. The optical image system of claim 18, wherein a maximum optical effective radius of the object-side surface of the first lens element is Y11, a maximum optical effective radius of an image-side surface of the third lens element is Y32, and the following condition is satisfied:

$1.05 < Y11/Y32 < 2.0$.

20. The optical image system of claim 18, wherein a central thickness of the first lens element is CT1, an axial distance between the image-side surface of the sixth lens element and an image surface is BL, and the following condition is satisfied:

$0.90 < CT1/BL < 2.5$.

21. The optical image system of claim 18, wherein an Abbe number of the second lens element is V2, an Abbe number of the third lens element is V3, an Abbe number of the fourth lens element is V4, and the following condition is satisfied:

$30 < V2+V3+V4 < 90$.

22. The optical image system of claim 18, wherein the focal length of the first lens element is f1, a focal length of the fourth lens element is f4, and the following condition is satisfied:

$0.10 < f1/f4 < 1.0$.

23. The optical image system of claim 18, wherein a focal length of the optical image system is f, a maximum image height of the optical image system is ImgH, and the following condition is satisfied:

$2.0 < f/ImgH < 7.5$.

24. The optical image system of claim 18, wherein the sixth lens element has the image-side surface being convex in a paraxial region thereof.

25. The optical image system of claim 18, wherein a focal length of the optical image system is f, an entrance pupil diameter of the optical image system is EPD, and the following condition is satisfied:

$1.80 < f/EPD < 3.0$.

26. The optical image system of claim 18, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following condition is satisfied:

$1.0<T56/(T12+T23+T34+T45)<5.0$.

27. An optical image system comprising, in order from an object side to an image side:
    a first lens element with positive refractive power having an object-side surface being convex in a paraxial region thereof;
    a second lens element;
    a third lens element having negative refractive power;
    a fourth lens element;
    a fifth lens element with negative refractive power having an object-side surface and an image-side surface being both aspheric; and
    a sixth lens element having an image-side surface being convex in a paraxial region thereof, and an object-side surface and the image-side surface of the sixth lens element being both aspheric;
    wherein the optical image system has a total of six lens elements, there is an air space between every two lens elements of the first lens element, the second lens element, the third lens element, the fourth lens element, the fifth lens element and the sixth lens element that are adjacent to each other, at least one surface of at least one of the fifth lens element and the sixth lens element comprises at least one inflection point, a focal length of the first lens element is f1, a focal length of the second lens element is f2, a focal length of the third lens element is f3, a focal length of the fifth lens element is f5, a focal length of the sixth lens element is f6, an Abbe number of the second lens element is V2, and Abbe number of the third lens element is V3, an Abbe number of the fourth lens element is V4, and the following conditions are satisfied:

$-1.50<f3/f2<1.50$;

$-2.75<f1/f3<0$;

$-2.4<f5/f6<1.75$; and $30<V2+V3+V4<90$.

28. The optical image system of claim 27, wherein an Abbe number of the second lens element is V2, an Abbe number of the third lens element is V3, an Abbe number of the fourth lens element is V4, and the following condition is satisfied:

$30<V2+V3+V4<90$.

29. The optical image system of claim 27, wherein a focal length of the optical image system is f, an entrance pupil diameter of the optical image system is EPD, a maximum image height of the optical image system is ImgH, and the following conditions are satisfied:

$1.80<f/EPD<3.0$; and $2.0<f/ImgH<7.5$.

30. The optical image system of claim 27, wherein the focal length of the first lens element is f1, a focal length of the fourth lens element is f4, and the following condition is satisfied:

$0.10<f1/f4<1.0$.

31. The optical image system of claim 27, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following condition is satisfied:

$1.0<T56/(T12+T23+T34+T45)<5.0$.

32. The optical image system of claim 27, wherein the focal length of the fifth lens element is f5, the focal length of the sixth lens element is f6, and the following condition is satisfied:

$0<f5/f6<1.5$.

* * * * *

UNITED STATES PATENT AND TRADEMARK OFFICE
CERTIFICATE OF CORRECTION

PATENT NO. : 9,857,563 B2
APPLICATION NO. : 15/226057
DATED : January 2, 2018
INVENTOR(S) : Liao et al.

Page 1 of 1

It is certified that error appears in the above-identified patent and that said Letters Patent is hereby corrected as shown below:

In the Claims

In Claim 27 (Column 43, Lines 31-32), please delete "and Abbe number of the third lens element is V3" and insert therefor: -- an Abbe number of the third lens element is V3 --

Signed and Sealed this
Fifteenth Day of January, 2019

Andrei Iancu
*Director of the United States Patent and Trademark Office*